Figure 14:
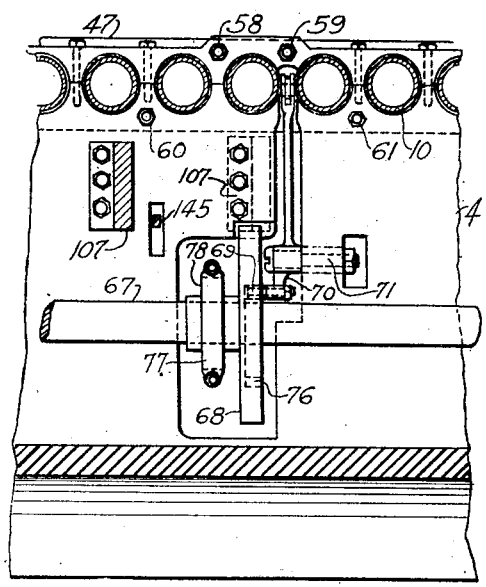

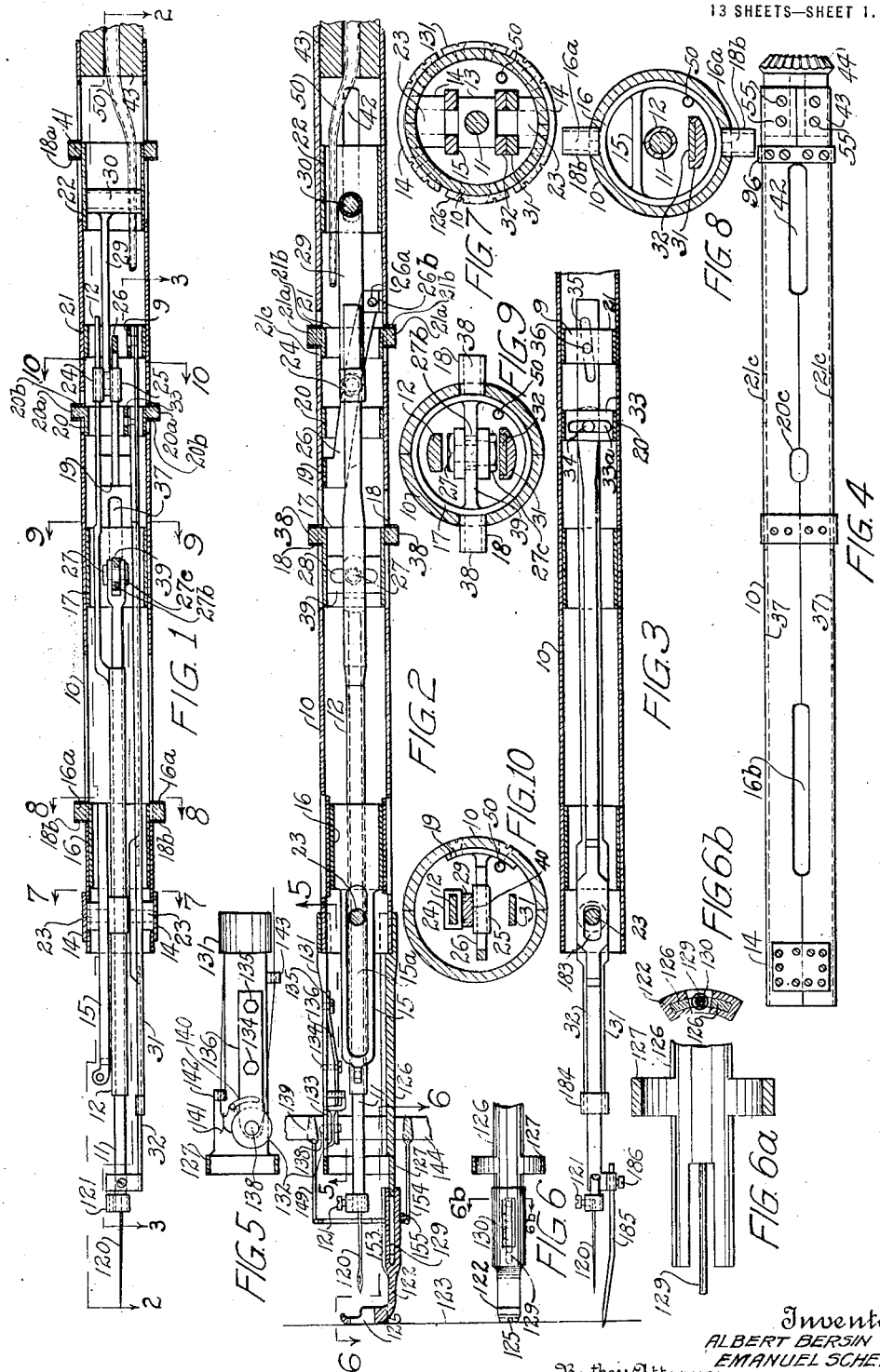

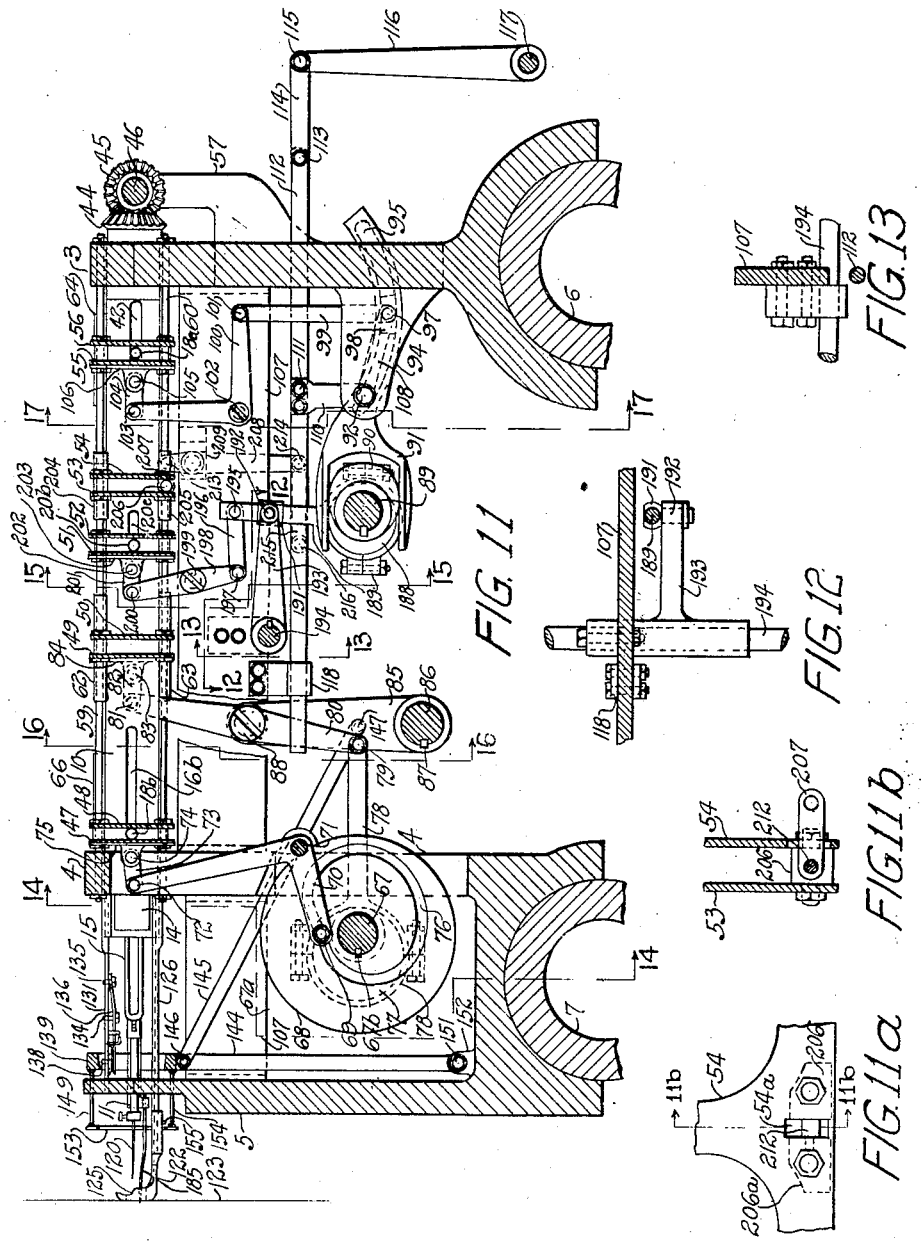

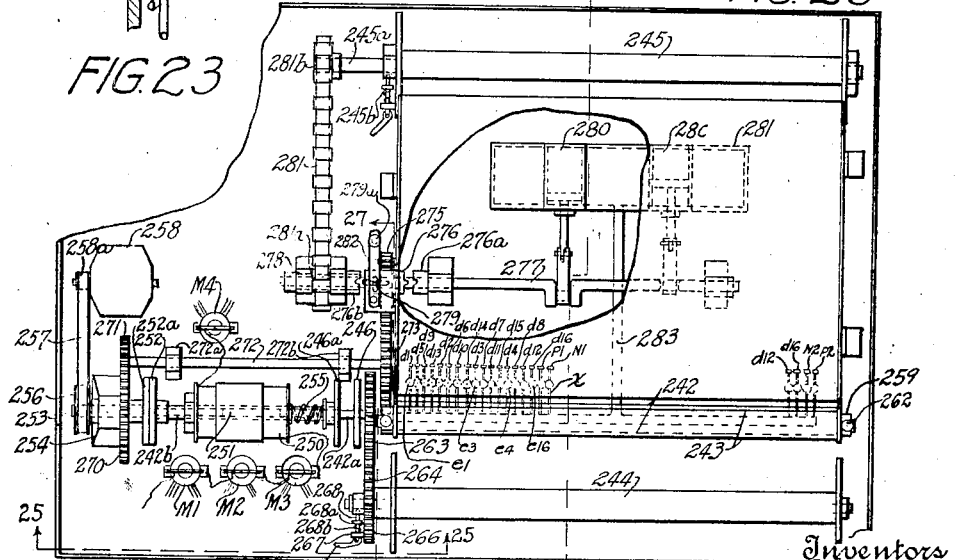

A. BERSIN AND E. SCHEYER.
EMBROIDERING MACHINE.
APPLICATION FILED MAR. 6, 1916.
1,344,611.
Patented June 29, 1920.
13 SHEETS—SHEET 5.
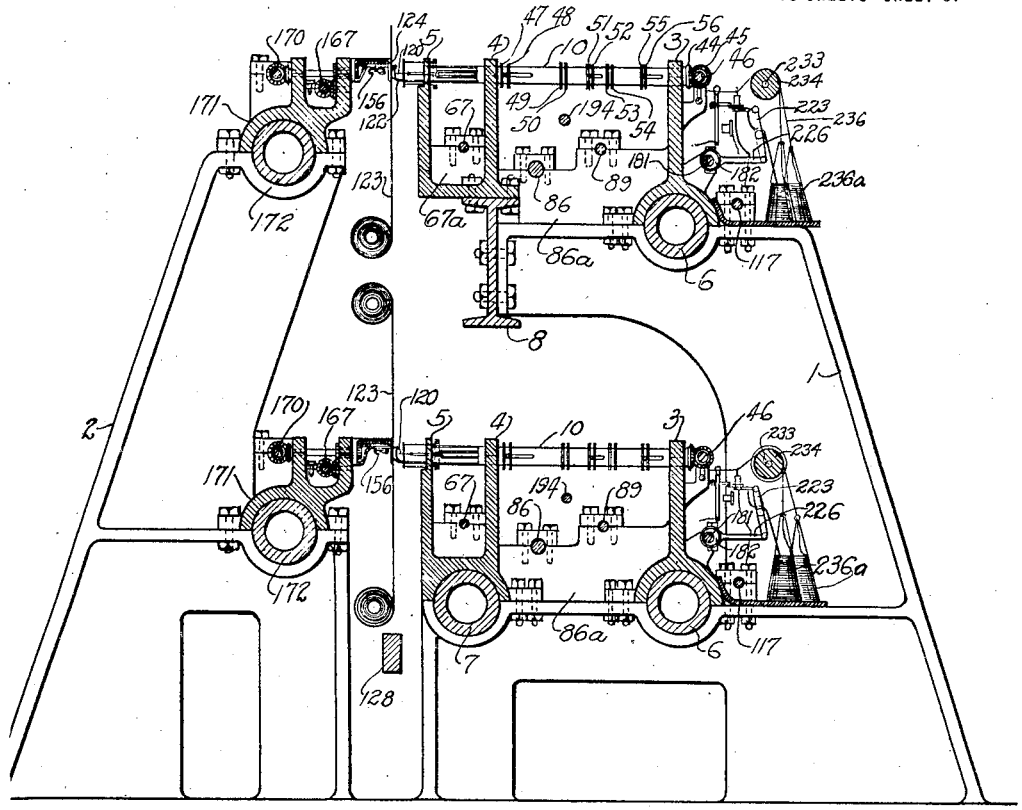
FIG. 28
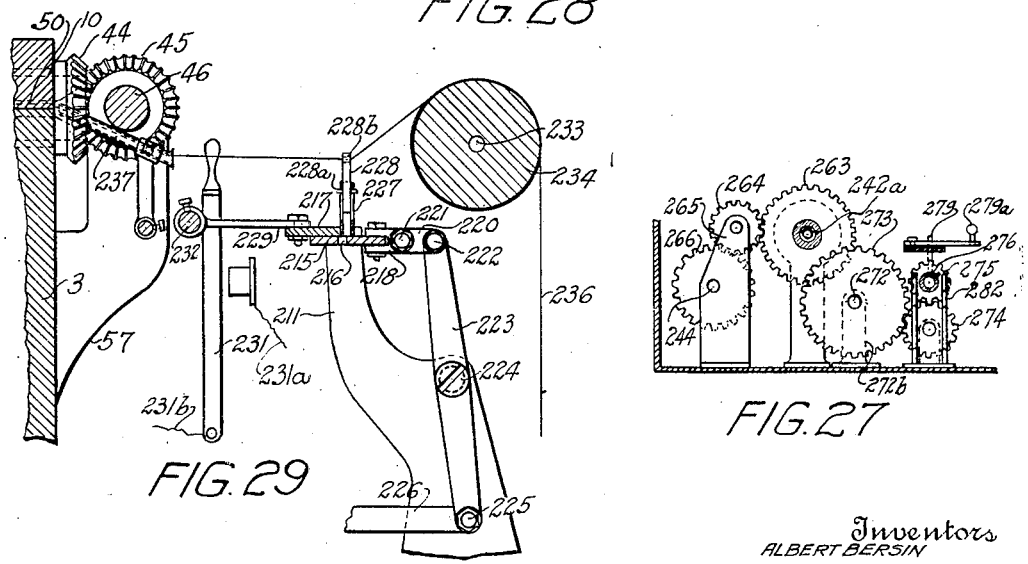
FIG. 29
FIG. 27
Inventors
ALBERT BERSIN
EMANUEL SCHEYER
By their Attorney
Albert Bersin

A. BERSIN AND E. SCHEYER.
EMBROIDERING MACHINE.
APPLICATION FILED MAR. 6, 1916.

1,344,611.

Patented June 29, 1920.
13 SHEETS—SHEET 6.

Inventors
ALBERT BERSIN
EMANUEL SCHEYER
By their Attorney

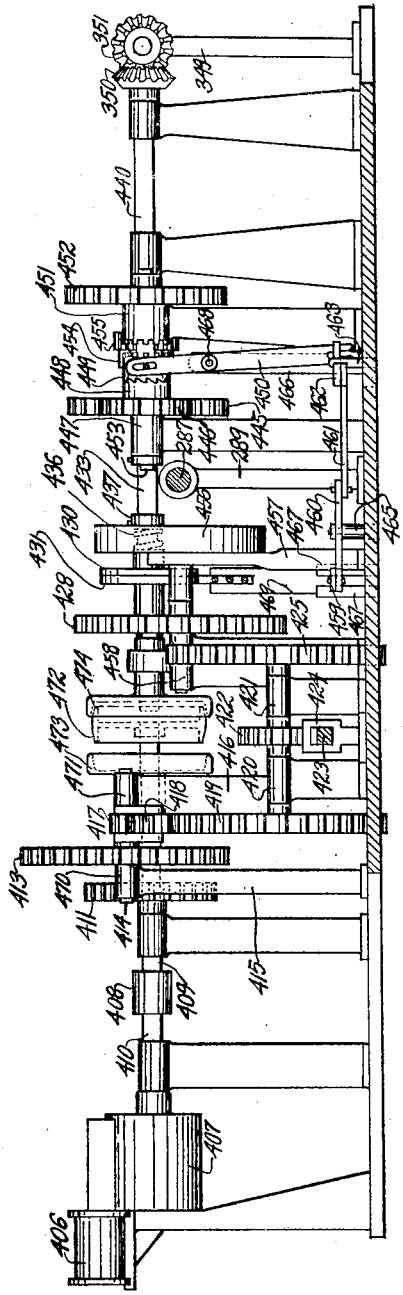

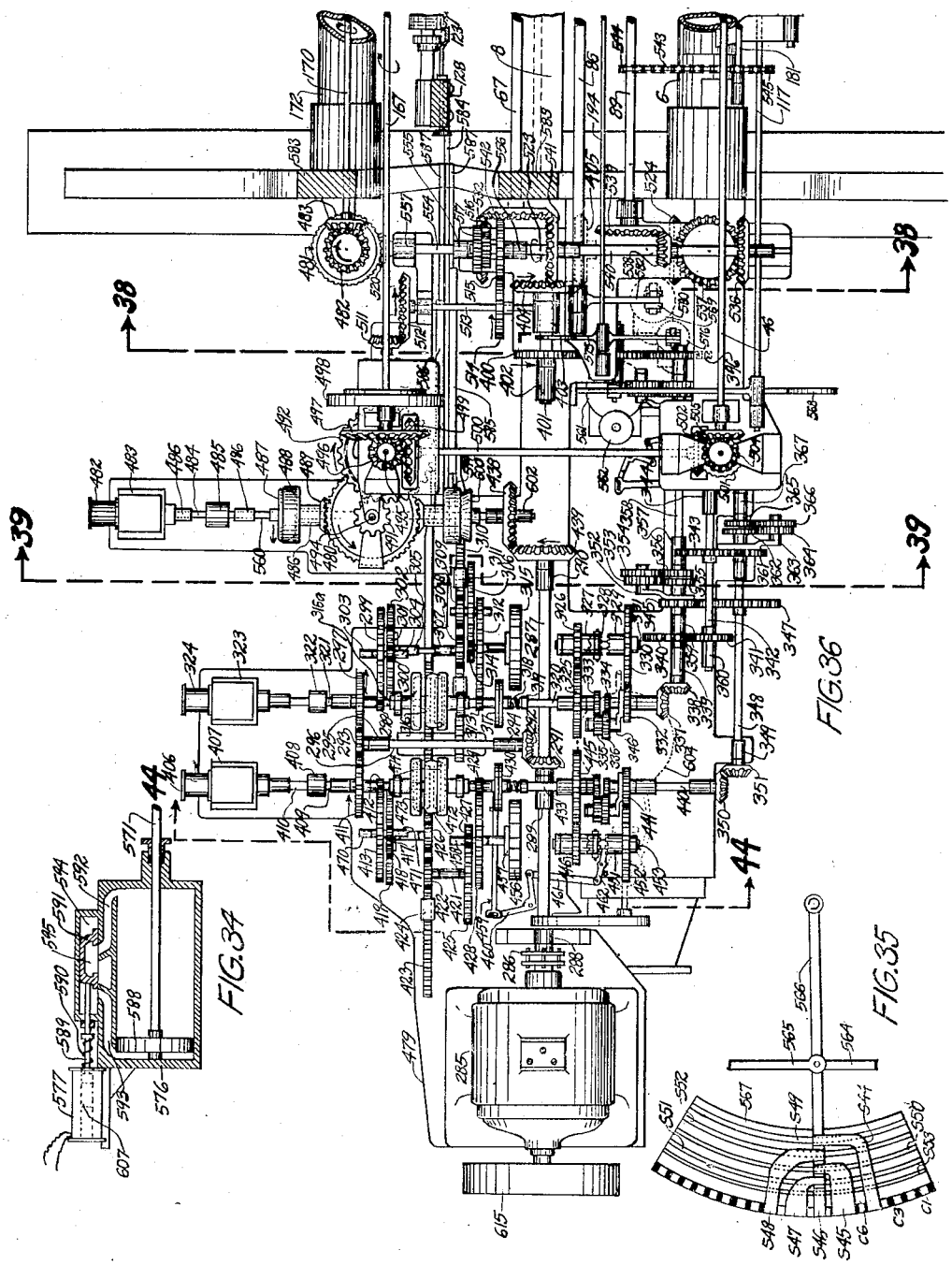

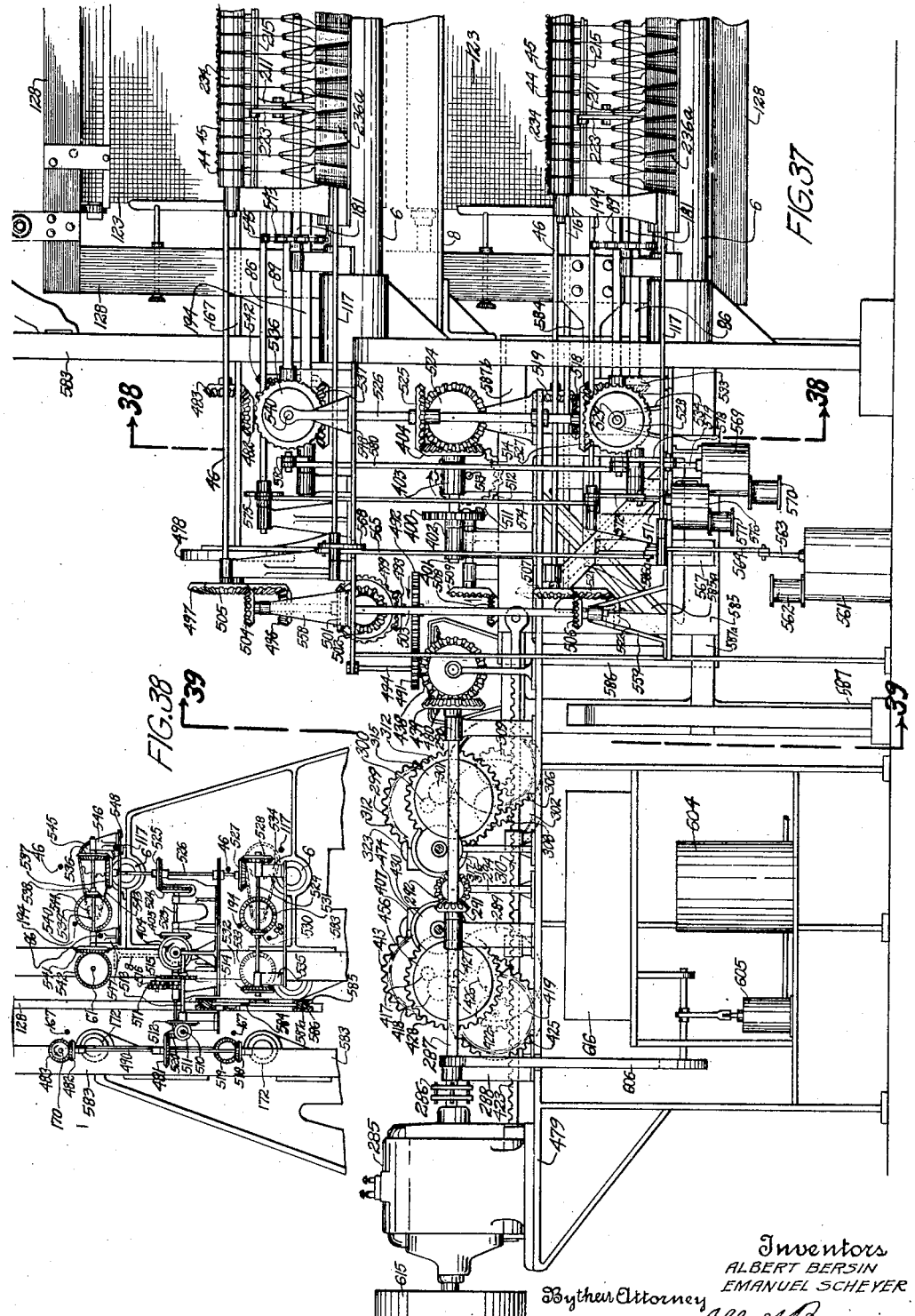

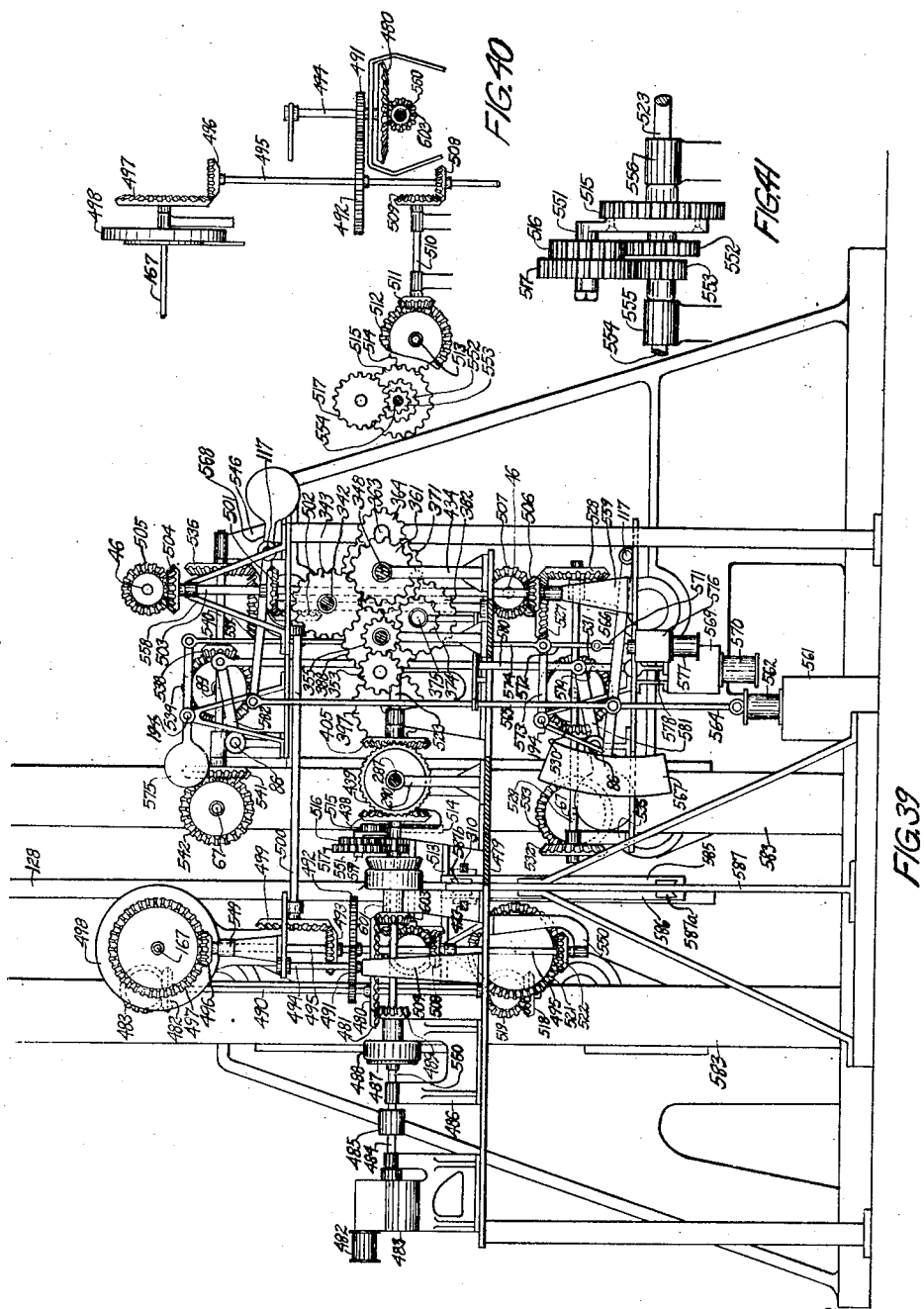

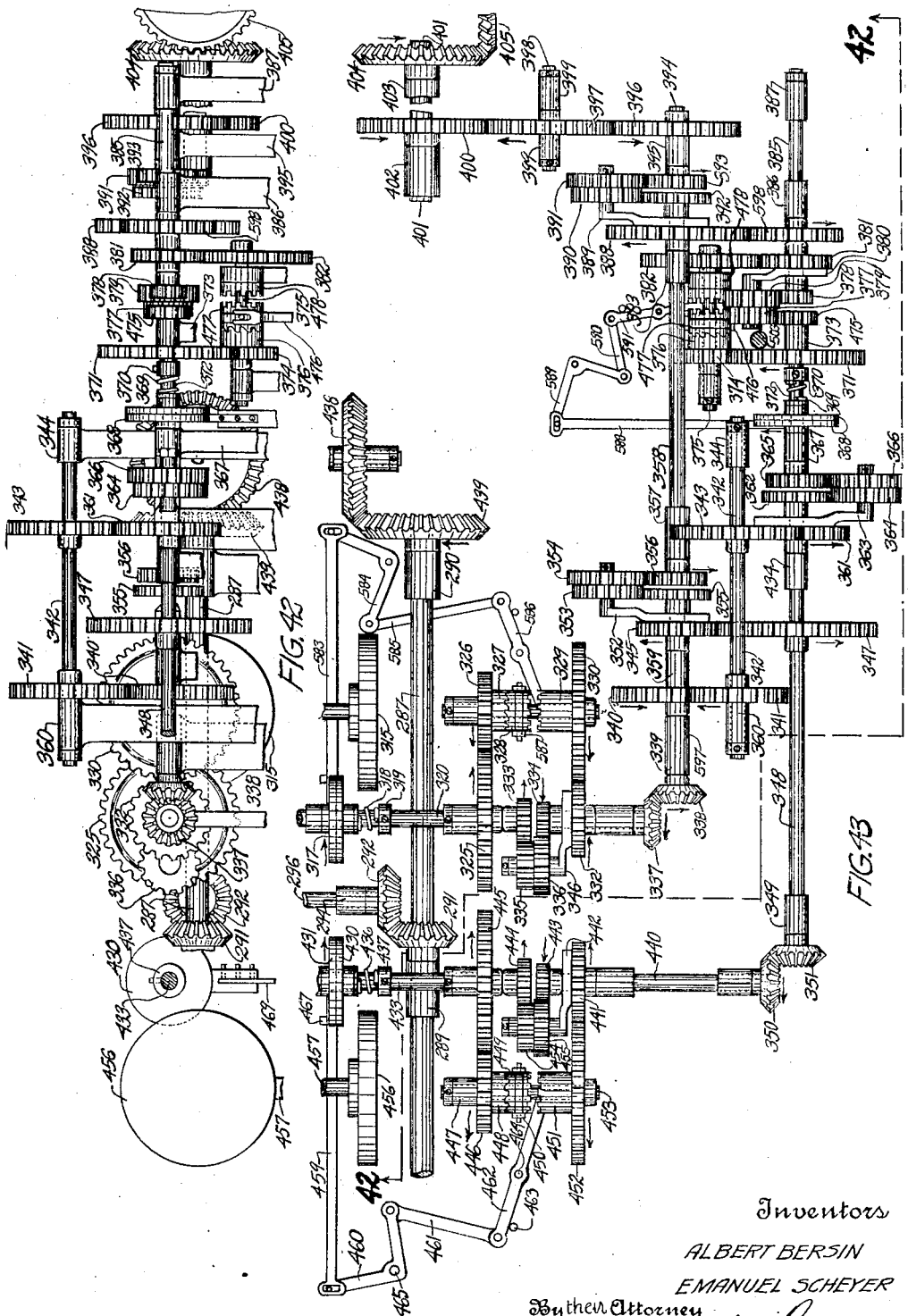

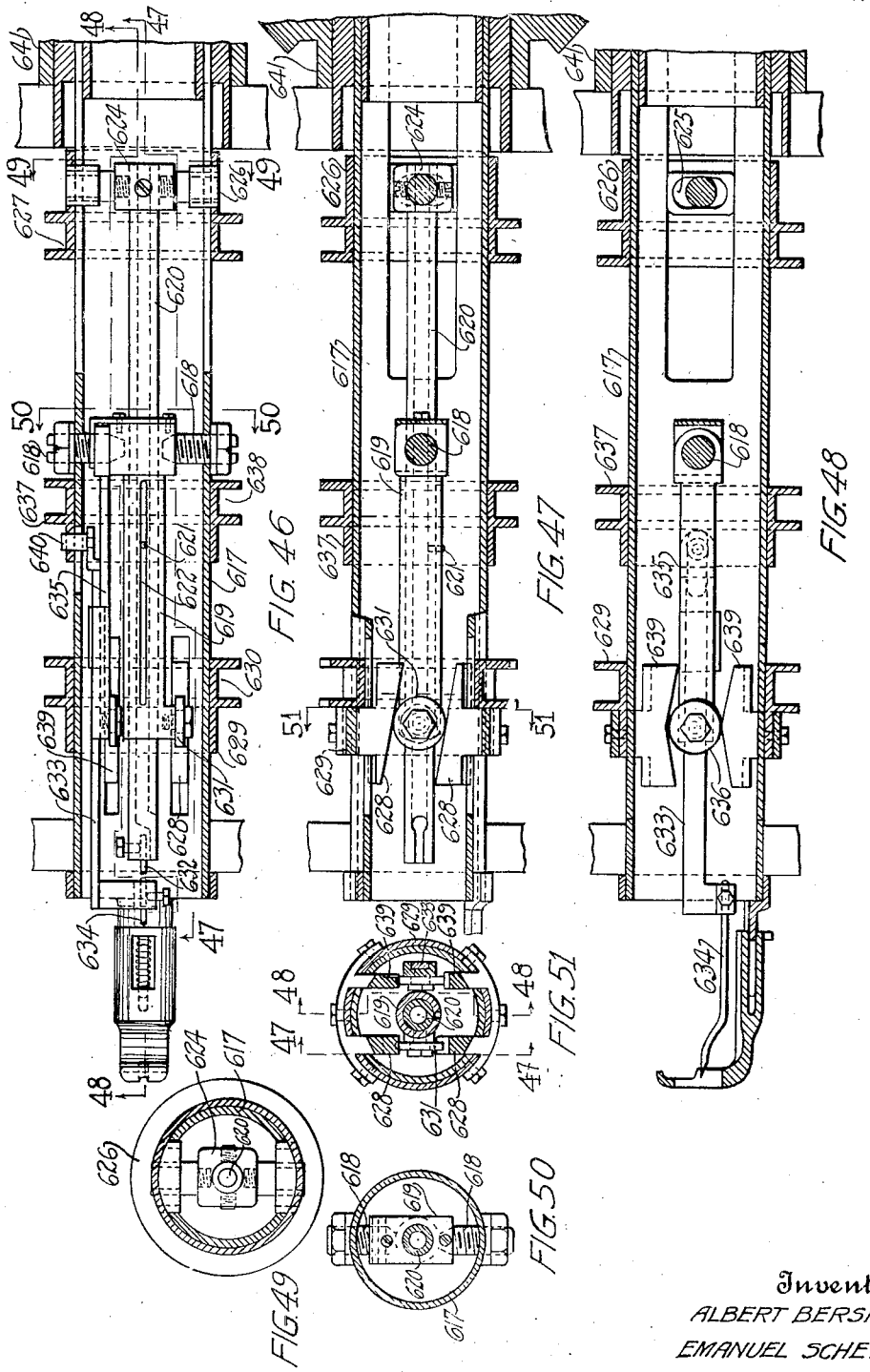

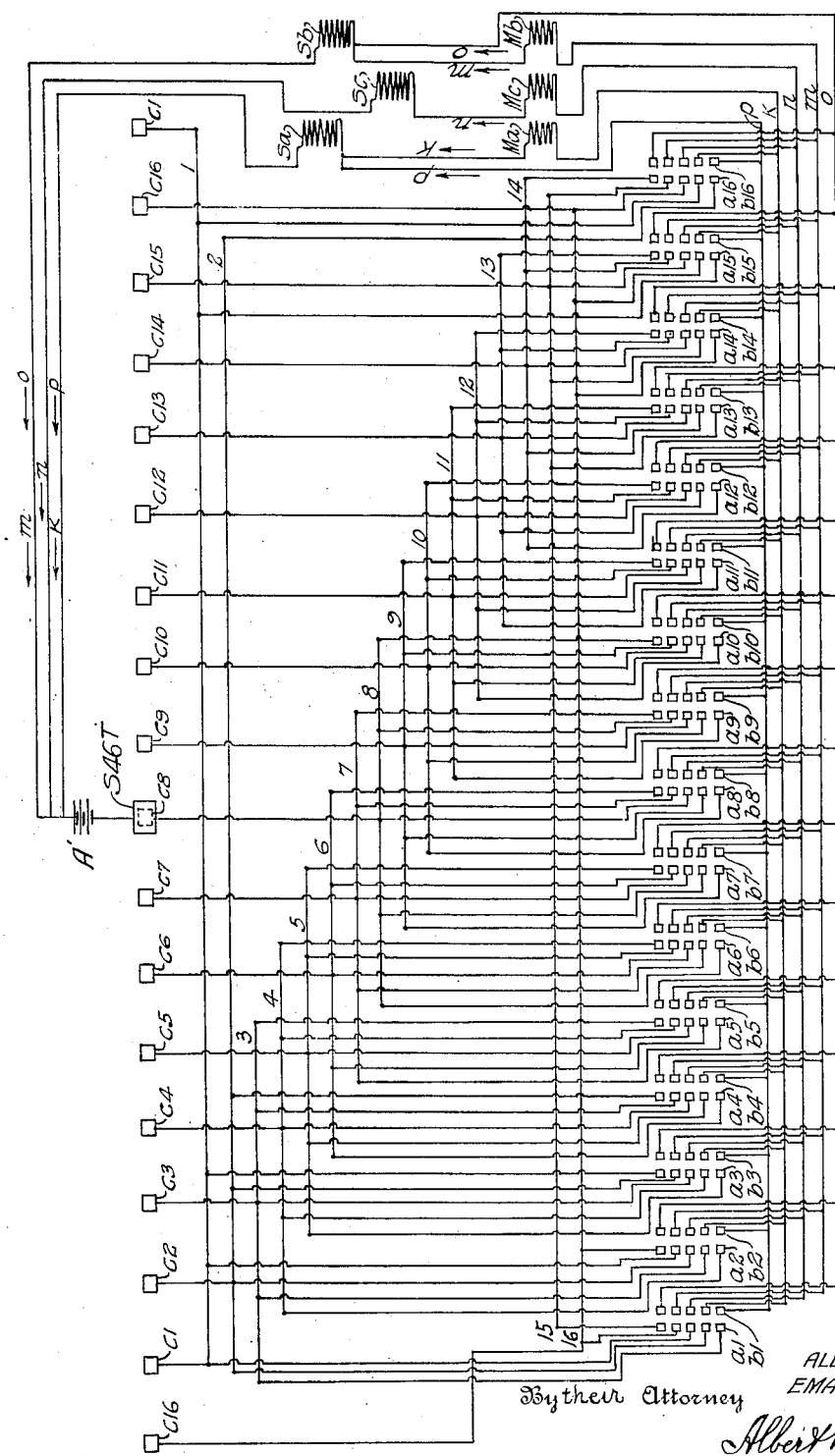

UNITED STATES PATENT OFFICE.

ALBERT BERSIN, OF BROOKLYN, AND EMANUEL SCHEYER, OF NEW YORK, N. Y.

EMBROIDERING-MACHINE.

1,344,611.  Specification of Letters Patent.  Patented June 29, 1920.

Application filed March 6, 1916. Serial No. 82,512.

*To all whom it may concern:*

Be it known that we, ALBERT BERSIN, a citizen of the United States of America, residing at New York, borough of Brooklyn, county of Kings, and State of New York, and EMANUEL SCHEYER, a citizen of the United States of America, residing at New York, borough of Queens, county of Queens, and State of New York, have invented certain new and useful Improvements in Embroidering-Machines, of which the following is a specification.

The present invention has special reference to sewing machines in which the fabric is stretched upon a fabric frame suitably mounted to be moved past stitch forming mechanism, the motion of the fabric frame being controlled in accordance with a predetermined pattern sheet or record. There are two general types in use now; in one type the needle has simple reciprocation, in the other the needle has oscillation or overseaming motion in addition to reciprocation. In the first type, commonly known as the "schiffli" embroidery or lace making machine, the machine is usually operated by a manually or a jacquard controlled pantograph which shifts the fabric frame intermittently, and in the intervals of rest, the needle is reciprocated, there being a shift of the frame after each reciprocation of the needle. In the second type of machine, where the over-seaming or zig-zag form of stitching mechanism is used, the needle oscillates laterally in addition to its reciprocation and the fabric frame is moved about in one form manually with more or less continuous motion following the center line of the required design while the amplitude of the oscillation is controlled by the knee of the operator in accordance with the successive widths of the design. In automatic machines of the second type, the fabric frame in addition to its motion of rotation, is capable only of translation backward and forward along a single fixed line, the motion of the frame being usually controlled by means of cams which also control the amplitude of oscillation of the needle.

In the present invention, which belongs to the class of machines of the second type, the preferred form consists of a machine in which the fabric frame is capable of translation in all directions in a plane, and the plane of oscillation of the needle or its oscillating position is capable of rotation repeatedly in either or both directions. The amplitude of oscillation also is variable. The above mentioned motions may be produced manually, but in the preferred form they are produced, automatically, by means of a record of motion, perforated or otherwise marked in accordance with the desired speeds, extents and directions of motion of the several parts of the embroidery machine. The record controls the action of mechanism for moving the fabric frame and the motions of the stitch-forming mechanism. This record and its accompanying motion controlling mechanism form the subject of United States Patents Nos. 1,172,058 and 1,172,059, February 15, 1916, to Emanuel Scheyer, British Patent No. 25,059, A. D. 1913, and French Patent No. 474,675, 1913.

In existing "schiffli" machines arranged for open-work embroidery, the fabric frame must be shifted from its stitching position to a point opposite the perforating tool in order to cause the hole to be punched in the proper place. After the hole is formed the frame is shifted back to its position for stitching and the eyelet is then completed. In the present invention the punch is adapted to keep cutting away the material from the inside of the eyelet while at the same time the needle is stitching it. This obviates the shifting of the frame noted above in connection with existing machines, and greatly increases the speed of operation.

Another feature of the present invention is the mechanism provided for lifting the needle entirely clear of the fabric and at the same time permitting the full operation of the needle in reciprocation and oscillation. This permits of the needle, while going at full speed, being dipped into the fabric here and there in accordance with the design. Mechanism is also provided for the stoppage of the machine and the lifting of the needle should any thread break.

A construction according to this invention is illustrated by way of example, in the accompanying drawings in which—

Figure 30:
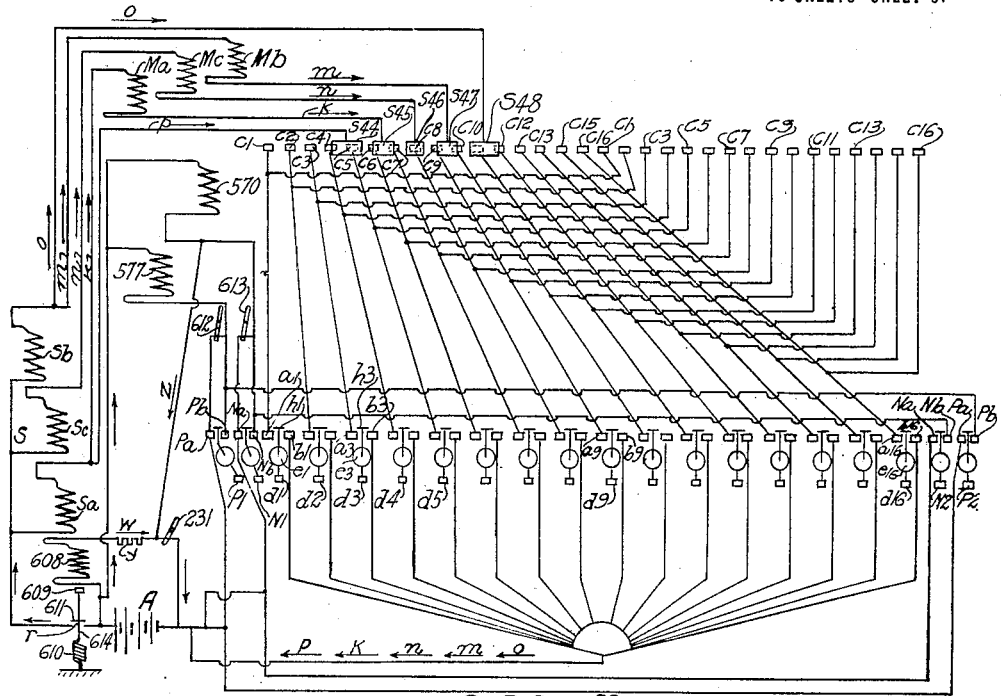
Figures 31, 32:
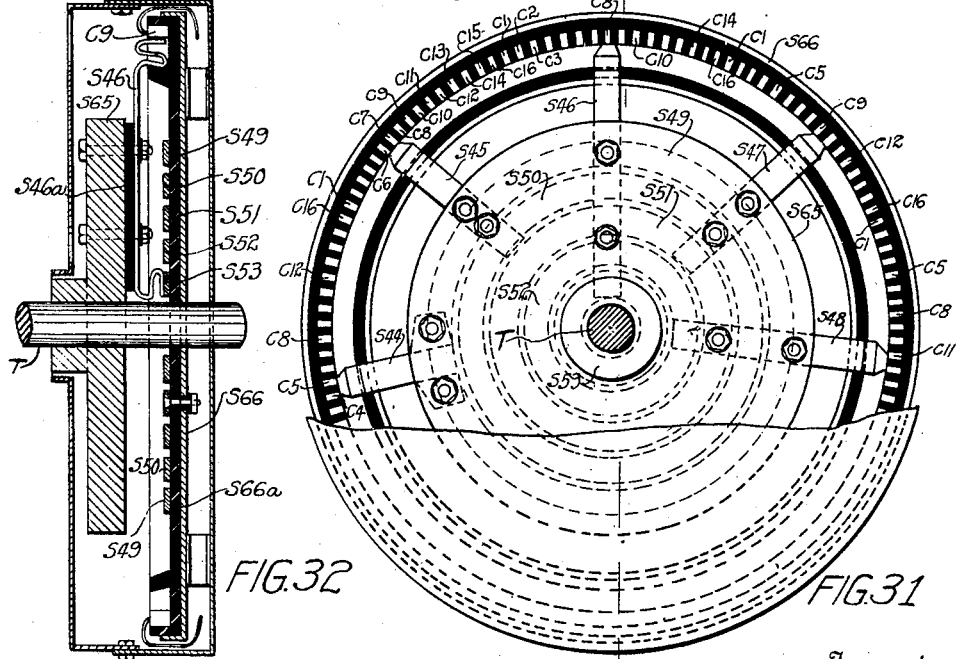

Figure 1 is a longitudinal section of the needle barrel, with the presser foot and tension plate mechanism omitted. Fig. 2 is a section along the line 2—2 of Fig. 1 and shows in addition the presser foot and tension plate mechanism. Fig. 3 is a section along the line 3—3 of Fig. 1. Fig. 4 shows a detail of the barrel itself removed from the rest of the mechanism. Fig. 5 is a section along the line 5—5 of Fig. 2 and shows the tension plates and method of holding the thread. Fig. 6 is a section along the line 6—6 of Fig. 2 and shows the mechanism of the presser foot. Fig. 7 is a cross section of the barrel along the line 7—7 of Fig. 1. Figs. 8, 9 and 10 are also cross sections of the barrel, along the lines 8—8, 9—9, and 10—10 respectively of Fig. 1. Fig. 11 is a section of the machine between two barrels showing the mechanism for driving the needles and punches. Figs. 11$^a$ and 11$^b$ show details of the twin driving plates. Figs. 12 and 13 are sections of Fig. 11 taken along the lines 12—12 and 13—13 showing details of the mechanism for controlling the reciprocation of the punches. Figs. 14, 15, 16 and 17 are sections of Fig. 11 taken along the lines 14—14, 15—15, 16—16 and 17—17. Fig. 18 is a section in the rear of the fabric, showing the loop taker and its driving mechanism. Fig. 19 is a section of Fig. 18 taken along the line 19—19. Fig. 20 is a plan view of the throat-plate taken along the line 20—20 of Fig. 18. Fig. 21 is a cross section along the line 21—21 of Fig. 18. Fig. 22 is a cross section along the line 22—22 of Fig. 26. Fig. 23 is a cross section of one of the pneumatics controlled by the perforations of the record. Fig. 24 shows an electrical method to be controlled directly by a perforated record. Fig. 26 is a plan view of the record feeding mechanism, exhaust and tracker board. Figs. 25 and 27 are cross sections of Fig. 26 along the lines 25—25 and 27—27. Fig. 28 is a complete cross section of the machine at one of the intermediate supporting frames. Fig. 29 shows the mechanism for stopping the operation of the machine should a thread break; Fig. 30 is the circuit diagram of the control; Fig. 31 is a view of the electrical selector; Fig. 32 is a section of Fig. 31 along the line 32—32; Fig. 33 shows a piece of the perforated record sheet; Fig. 34 is a section of the punch control cylinder; Fig. 35 is a view of the selector for controlling the amplitude of oscillation of the needles; Fig. 36 is a plan view of the end control of the machine; Fig. 37 is an elevation of the machine omitting some of the gearing for driving the stitch forming mechanism; Figs. 38 and 39 are cross sections of the machine along the lines 38—38 and 39—39 of Figs. 36 and 37; Fig. 40 shows the gearing between the mechanism for controlling the rotation of the plane of oscillation and the differential gears for compensating the rotation of the loop taker; Fig. 41 shows the differential gearing used to compensate the rotation of the loop taker; Fig. 43 is a plan of the gearing for operating the stitch forming mechanism in accordance with the motion of the fabric frame; Fig. 42 is a partial elevation and section of Fig. 43 taken along line 42—42; Fig. 44 is a partial elevation and section taken along the line 44—44 of Fig. 36; Fig. 45 is a perspective view of the clutch shifting mechanism for giving constant direction of rotation to shaft 440; Fig. 46 is a section through a modified form of needle mechanism; Fig. 47 is a section along the lines 47—47 of Figs. 46 and 51; Fig. 48 is a section along the lines 48—48 of Figs. 46 and 51; Fig. 49 is a cross section of the barrel along the line 49—49 of Fig. 46; Fig. 50 is a cross section along the line 50—50 of Fig. 46; Fig. 51 is a cross section along the line 51—51 of Fig. 46; and Fig. 52 is a diagram of the one arm selector.

The fabric 123 is mounted within the fabric frame 128 by means well known to the art. The fabric frame 128 is suspended and counterbalanced upon supporting frames 583 which are shown on Figs. 36, 37, 38 and 39. There is a similar pair at the far end of the machine beyond the limits of the drawings. The support and counterbalancing of the fabric frame 128 is also a construction so well known to the art that it is needless to describe it here. The fabric frame 128 is rigidly attached to the arm 584 one end of which is upset and fits slidingly into the intersection of the diagonal channels 585$^a$ and 586$^a$ of the sliding frames 585 and 586 respectively. The horizontal sliding of the frames 585 and 586 on the guides 587$^a$ and 587$^b$ varies the position of the point of intersection of the diagonal channels 585$^a$ and 586$^a$ and accordingly shifts the position of the arm 584 and with it the fabric frame 128 much in the same manner as is done in certain existing forms of jaquard controlled embroidery machines. The guides 587$^a$ and 587$^b$ are fastened to supports 587 which are fastened to the floor. The racks 310 and 423 are fastened to the sliding frames 585 and 586 respectively. The motion of these racks is controlled by a record, of the general appearance of those used in automatic pianos, perforated or otherwise marked (preferably perforated) in accordance with the design. And it will be hereinafter shown that as the fabric frame 128 is moved in accordance with the motion called for by the record, the stitching mechanism is driven in accordance with the motion of the fabric frame so that there is always a predetermined number of stitches per unit length of travel of the frame.

The needles 120 (Fig. 28) are arranged in two rows one above the other in front of the fabric 123. In Fig. 37 if shown they would occur behind the cylindrical casing 234. The barrels 10 as will be explained later are adapted to support the mechanism for reciprocating and oscillating the needles 120. These barrels 10 are supported in uprights 3, 4 and 5, the uprights 3 being supported upon the tubes 6 which run the length of the machine being supported at one or two intermediate points by flanged cross frames 1. The upper uprights 4 and 5 forming one piece are supported upon the I beam 8 which spans between the front end supports 583 of the fabric frame 128, while the lower uprights 4 and 5 run the length of the machine upon tube 7 which is supported at one or two intermediate points by flanged cross frames 1.

There are two rows of loop takers 156 with their driving mechanism, corresponding to the needles 120, each row being supported by a piece 171 held by a tube 172 which runs the length of the machine and is supported at one or two intermediate points by cross frames 2.

The perforations of the record, coöperating with selective mechanism, as will be hereinafter explained, control the successive positions (Figs. 36 and 44) of the clutches 316 and 472, and the racks 310 and 423 are moved to the right or to the left in accordance with the positions of these clutches.

Referring to Figs. 1 and 2, the needle bar 11 reciprocates in the guide 12 which in turn oscillates about the pins 23 as axis. The pins 23 are projections of the guide 12 and fit into the bearings 14 which are in turn attached to the outer shell or barrel 10, as shown in detail in Fig. 7. The needle bar 11 is thus free to reciprocate within the guide 12, while oscillating with it. The inside sleeve 17 has a sliding fit in the barrel 10. In order to facilitate assembling the barrel 10 is made of two half cylinders fastened together (see Fig. 4). The friction rollers 18 slide in the slots 37 of the barrel 10 and fit over the pins 38 projecting from opposite sides of the sleeve 17. The sleeve 17 is free to reciprocate inside of the barrel 10 but must rotate with it. The bridge 39 which has a curved slot 28 in it is fastened inside of the sleeve 17. The fork shaped top of the needle bar 11 fits over the bridge 39, each prong having a hole in it, the holes being in alinement with each other and the slot 28. Through these holes and the slot are fitted the bolts 27 and 27ᶜ and the friction roller 27ᵇ which has a sliding fit with the slot. The bolt 27ᶜ which carries the roller 27ᵇ is internally threaded to receive the bolt 27 (see Fig. 9). It will thus be seen that if the sleeve 17 be reciprocated, the needle bar 11 is reciprocated with it, the needle bar being at the same time free to oscillate with the guide 12, when the latter oscillates about the pins 23 as axis. The guide 12 is flattened at the top as shown in detail in Figs. 1, 9 and 10. The sleeve 24, which is formed to slide over the flattened portion of the guide 12, is provided with a projecting pin which fits into a corresponding hollow projection on the sleeve 25, so that the sleeves 24 and 25 can travel together and have rotation relative to each other. The inside of the sleeve 25 is curved so as to adapt it to slide over the curved guide 26 which is in turn attached to the inside of the barrel 10. The driving link 29, having hollow cylindrical ends, is adapted to have one of its ends fit over the hollow projection of the sleeve 25 while the other end fits over the pin 30 which latter is fastened inside of the inside sleeve 22. The sleeve 22 being similar to the sleeve 17 is provided with projecting pins 41 over which fit the friction rollers 18ᵃ adapted to slide in the grooves 42 of the barrel 10 (Fig. 11). When the sleeve 22 is reciprocated, the link 29 is reciprocated with it, this in turn causing the sleeve 25 to reciprocate along the guide 26 carrying with it the sleeve 24. As the sleeve 24 slides over the guide 12 it rocks the guide about the axis of the pins 23, thus causing oscillation of the needle bar whenever the sleeve 22 is reciprocated.

The curve of the guide 26 is circular and is of such a radius and so placed in the barrel that the angular displacement of the needle bar 11 is approximately constant for equal distances passed through by the sleeve 22. The amplitude of the oscillation of the needle bar 11 varies with the length of stroke of the sleeve 22. The guide 26 is fastened inside of the barrel by the flange 19 at one end and the screw 26ᵃ and clip angle 26ᵇ at the other. The bushing 43 fitting into the end of the barrel 10 and being held in place by the countersunk screws 55 serves as a means for keeping the two segments of the barrel 10 together, as a support for the thread tube 50 and for attaching the bevel gear 44. The barrel 10 rotates in suitable bearings in the frames 3 and 4 (see Figs. 11 and 28).

By referring to Figs. 28 and 37 it will be seen that the machine herein described shows a plurality of needles after the manner of the pantograph schiffli machines, a barrel 10 for each needle and all of the said barrels rotating in the frames 3 and 4 which extend for the full length of the machine. It will be evident that the same construction disclosed herein, with modifications evident to any one familiar with the art, can be used for a single needle machine.

Figure 16:
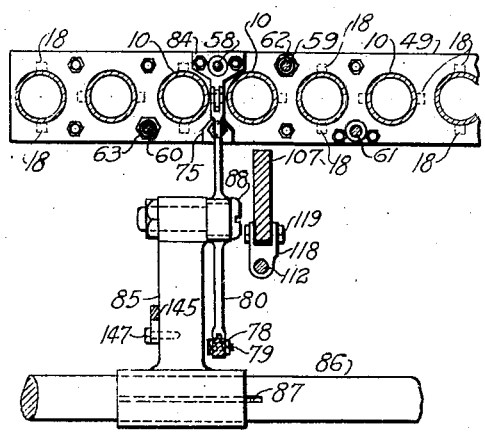
Figure 17:
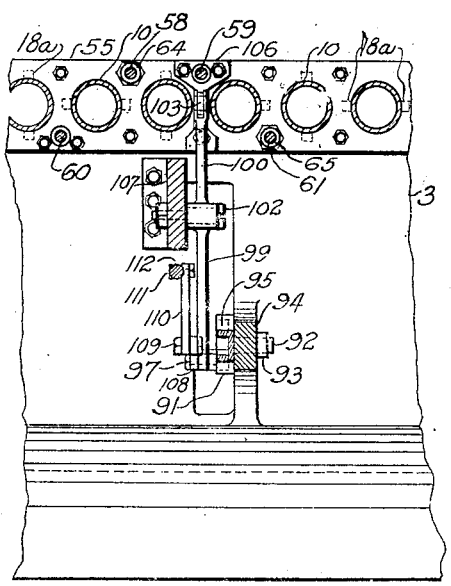

Referring again to Figs. 11 and 37, the shaft 46, rotating in suitable bearings in the supports 57, and extending the length of the machine carries a series of bevel gears 45, each one mating with a corresponding bevel gear 44, attached to a bushing 43 in each of the barrels 10. When the shaft 46 is rotated in either direction the barrels 10 are rotated correspondingly, the axis of oscillation of the needle bar 11 at the pins 23 being carried around with the barrel. In order to reciprocate the sleeves 17 and 22 and at the same time allow for the rotation of the barrel 10, we have provided the following means: Referring to Figs. 11, 16 and 17, the twin driving plates 49 and 50, and 55 and 56 extend along the length of the machine parallel to the frames 3 and 4. Circular openings of a size to fit the outer circumference of the barrels 10 are provided at distances center to center corresponding to the distances center to center of the barrels. The plates 49 and 50, and 55 and 56 are separated from each other by means of ring separators a distance sufficient to permit their corresponding friction rollers 18 and 18ᵃ to work between them. Each pair of plates is held together by means of bolts and nuts as shown. The twin plates 49 and 50 are adapted to reciprocate parallel to the long axes of the barrels by means of the sleeves 62 and 63, and the guide rods 59 and 60, which span across from frame 3 to frame 4. These sleeves are adapted to slide over the rods and thereby keep the plates in alinement. There are a series of twin plates 49 and 50, each pair being of sufficient length to embrace ten barrels 10. This is a preferable length although we do not limit ourselves to it; practical considerations such as the stiffness of the plates and their weight are the factors that determine their length. Each pair of plates 49 and 50 has four guide rods, two rods 59 and two rods 60 and their corresponding sleeves. Alternating with the rods 59 and 60 are similar guide rods 58 and 61 also spannig from frame 3 to frame 4 and having mating sleeves 64 and 65 fastened to the twin plates 55 and 56. The plates 55 and 56 are ranged along the machine in a similar manner to the plates 49 and 50, each pair of plates 55 and 56 sliding on four guide rods, two rods 58 and two rods 61. The two sets of twin plates 49, 50 and 55, 56 are parallel to each other, all four guide rods 58, 59, 60 and 61 passing through both sets of plates, the plates having openings large enough so that they do not interfere with the guide rods upon which their sleeves do not slide. The friction rollers 18 attached to the sleeves 17 are fitted between the plates 49 and 50 so that when the plates 49 and 50 are reciprocated along the rods 59 and 60, the sleeves 17 in the barrels 10 are also reciprocated and consequently the needle bars 11 are reciprocated. Similarly the rollers 18ᵃ fitting over the projecting pins 41 of the sleeves 22 are fitted in between the plates 55 and 56 so that when the plates 55 and 56 are reciprocated, the guide 12 in each barrel 10 is rocked, rocking thereby each needle bar 11 as described previously. It will be evident that this construction permits the reciprocation and the oscillation of the needle bar 11 for any angular position of the barrel 10. Referring to Fig. 11 it will be noted that the rotation of the shaft 46 causes rotation of the plane of oscillation of the needle bar.

Referring to Figs. 1, 2, 7 and 8, the thread take-up 15, attached to the sleeve 16 as shown in Fig. 8, is provided with a slot 15ᵃ fitting over and clearing the pin 23. The sleeve 16 is similar to the sleeves 17 and 22 and its two projecting pins 16ᵃ are provided with friction rollers 18ᵇ which slide in the slots 16ᵇ of the barrel 10. The portion of the rollers 18ᵇ projecting outside of the barrel 10 are engaged between the twin driving plates 47 and 48 similar to the driving plates 49, 50 and 55, 56. (See Fig. 11). The corresponding guide sleeves for the plates 47 and 48 are the sleeves 66 fitting over the guide rods 58 and 61. It will be evident that when the plates 47 and 48 are reciprocated, the take-up 15 is reciprocated irrespective of the angular position of the barrel 10.

Referring to Figs. 11, 14 and 28, the shaft 67 extending for the length of the machine and revolving in journals in the cross frames 67ᵃ carries a series of cams 68 which are fixed to it by means of keys 67ᵇ. The bell-crank lever 70 swinging about the pins 71 screwed into a projecting lug of the cross frame 4 is provided with a friction roller 69 which is adapted to remain in the groove 76 of the cam 68. One end of the link 73 is connected to the upper arm of bell-crank lever 70 by means of pin 72 while the other end of link 73 is connected to the projecting tongue of plate 75 by means of pin 74. The plate 75 is attached to plate 47 by means of bolts similar to the manner in which the plate 84 is connected to plate 49 (Fig. 16.) When shaft 67 is rotated, the cam groove 76 causes bell-crank lever 70 to rock with a variable motion and in consequence the driving plates 47—48 impart the required motion for stitching to the thread take-up 15.

There are two cams 68 and their coacting mechanisms for each length of the twin plates 47—48, throughout the machine, two plates 75 with their projecting tongues being attached for each length.

The eccentric 77, fixed to shaft 67, drives the eccentric rod 78 which is in turn connected to the rock lever 80 by means of the pin 79. The rock lever 80 rocks on the pin 88 which fits into the movable supporting arm 85. One end of the link 82 is connected to the upper part of rock lever 80 by means of pin 81, while the other end of link 82 is connected to the projecting tongue of plate 84 by means of pin 83. The plate 84 is attached to the plate 49 by means of bolts as shown in Fig. 16. It will now be evident that the rotation of the shaft 67 imparts a rocking motion to the rock lever 80 and this in turn causes the twin plates 49—50 to be reciprocated and in consequence the needle bar 11 is reciprocated as previously described.

There are two eccentrics 77 with their coacting mechanisms and supporting arms 85 for each length of the twin plates 49, 50 throughout the machine, two plates 84 with their projecting tongues being provided for each length.

In stitching embroidery work, it is frequently required to shift the fabric frame from one position to another without stitching, as for example where the design is not continuous. For shifting the fabric frame without stitching, the needles must be held out of engagement with the fabric. This is accomplished in our machine by providing means for lifting the needles far enough out of the fabric to permit of their reciprocation without reaching the fabric. The needles can continue to reciprocate uninterruptedly while lifted until the next figure of the design is reached when they dip into the fabric and stitch. This results in saving the time necessary to bring the needles to a stop and to start them again when dipped into the fabric. With a great number of needles and heavy driving shafts and intervening mechanism this factor assumed large proportions, but with a single needle machine or a machine with a few needles any mechanism which will stop the needle always out of the fabric can be used. Such a mechanism is described hereinafter in connection with the punching or perforating mechanism. In fact the mechanism for operating the punches and the mechanism for operating the needles are interchangeable.

The movable supporting arm 85 is rigidly fixed by means of key 87 to shaft 86. When it is desired to lift the needle out of the fabric, shaft 86 is caused to turn in the direction carrying arm 85 away from the fabric 123. The amount of angular movement given to the shaft 86 is such as to cause the needle to be out of the fabric even when it is at the extreme left of its stroke. The rotation of shaft 86 is controlled by the record as will be hereinafter shown.

Figure 15:
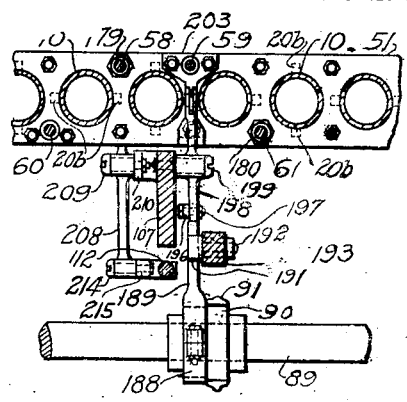

It will be recalled from the previous description that when the twin driving plates 55—56 are reciprocated along their corresponding guide rods 58 and 61, the needle bar 11 is oscillated, and that the amplitude of oscillation depends upon the length of stroke of the plates 55—56. In order to vary the stroke in accordance with the width required by the design, we have devised the following adaptation of the well known overseaming stitching mechanism. Referring to Figs. 11, 15 and 17, the fork shaped rock lever 91, provided with a curved groove 95 swings on its pin 92 which fits into the frame 94 and is held there by a collar 93. The jaws of rock lever 91 fit over cam 90, which is fixed to shaft 89 and is of the well known shape for producing the overseaming stitch. The shaft 89 runs for the length of the machine, rotating in bearings in the cross frames 86ª, its rate of rotation being one-half that of shaft 67. The bell-crank lever 100, rocking on pin 102 screwed into the cross frame 107 has its upper arm connected to one end of link 104 by means of pin 103 while its lower arm is connected to link 99 by means of pin 101. The other end of link 104 is connected by means of pin 105 to the projecting tongue of the plate 106 which is in turn connected to plate 55 as shown in Figs. 11 and 17. The lower end of the link 99 fits over the pin 97 projecting from the sliding block 98 which is adapted to slide in the curved groove 95 of the rock lever 91. It will now be evident by referring to Fig. 11 that when rock lever 91 is rocked by the rotation of cam 90, the rocking motion is imparted to bell-crank lever 100, through link 99 and the block 98. This in turn causes the plates 55—56 to be reciprocated. It will also be evident that if sliding block 98 be moved in groove 95 until the center of pin 97 coincides with the center of pin 92, there will be no rocking motion imparted to bell-crank lever 100, and as sliding block 98 is moved away from the center of pin 92, the amplitude of the rocking of bell-crank lever 100 is increased after the well known manner of overseaming stitching embroidery. As block 98 is moved back and forth the amplitude of oscillation of the needle is varied.

In order to vary the amplitude of oscillation of the needle automatically and thereby vary the width of the stitch in accordance with the requirements of the design, we have provided the following means. The rod 112, sliding in bearings in the frame 3 and in bearing 118 attached to cross frame 107, has one end of link 114 attached to its end by means of pin 113. The other end of link 114 is connected by means of pin 115 to the crank lever 116 which is in turn fixed to shaft 117 extending for the length of the machine. As the shaft 117 is turned in either direction, the rod 112 is moved with it. The link 108 has one end fitting over the pin 97 projecting from the sliding block 98 while the other end of the link is connected by means of pin 109 to the arm 110 which is connected to the sliding rod 112 by means of the bolts 111. It so happens owing to the particular position shown for the sliding rod 112 in Fig. 11 that the pin 109 is immediately behind the pin 92; the relation of these two pins is clearly shown in Fig. 17. It will therefore be evident that as shaft 117 is rotated in either direction, sliding block 98 moves in either direction with it, in the groove 95, varying the amplitude of oscillation of the needle accordingly. It will be hereinafter shown that the amount and direction of rotation of the shaft 117, and consequently the width of the stitching is controlled by the record. It will also be noted that the amplitude of oscillation is controlled and varied for all axial positions of the barrel 10.

Referring to Figs. 1, 2, 3, 6, 6ª and 28, the needle 120 is held in the needle clamp 121, and the presser foot 122, provided with a slot 125, is adapted to bear against the throat plate 124. The piece 126 having a circular projection 127 is fastened to the barrel 10 so that the projection 127 is concentric with the barrel. The projection 127 rotates with the barrel in bearings in the frame 5. The piece 126 is notched as shown in Fig. 6ª and the stem 129 adapted to receive the spring 130 is fixed to the piece 126 and projects from the notch. The right end of the presser foot 122 is shaped as shown in Fig. 6ᵇ and is adapted to fit over the notched end of the piece 126, the left end of the stem 129 fitting into a cavity in the presser foot 122. The spring 130 on the stem 129 holds the presser foot 122 against the throat plate 124.

In order to provide a suitable support for the thread tension disks 132 and 133, one end of a plate 131 is attached to the barrel 10 as shown in Figs. 2 and 5 while its other end is attached to the circular projection 127. The flat steel spring 136 made of one piece with or attached to the circular tension disk 132, is connected to plate 131 by means of the screw 135. The stud 138 is fixed to disk 132 and passes through a hole in the second tension disk 133 and plate 131 and projects beyond. The purpose of this projection is explained later. The screw 134 is used for tightening or releasing the thread tension.

The thread is delivered from the spool through intervening mechanism described hereinafter to the tube 50 which extends through the barrel 10 and is fixed to it. The right hand end of the tube 50 is concentric with the barrel to prevent twisting of the thread at its point of entry. From the tube 50 the thread is passed through the guide 143, then around and between the disks 132 and 133, it is then passed over the guide wire 140, then over the wire spring 141, thence through the guide 142 and from there through the eye of the thread take-up 15, thence through a guide in the needle clamp 121 and into the eye of the needle 120.

In order to automatically release the tension on the thread and to lift the presser foot, when the needle is lifted out of the fabric, we have provided the following means: The plate 139 running along the length of the machine, is provided with a series of circular openings, tapered as shown in section in Figs. 2 and 11, and at a distance apart equal to the distance center to center of the barrels 10. The links 144, hingedly fixed to the lugs 152, in the frame 5 by means of pins 151, and placed at suitable intervals along the machine opposite points where the movable supporting arms 85 are located, are rigidly fixed to the plate 139. The link 145 is connected at one end to link 144 by means of the pin 146 while the other end is connected by means of the pin 147 to the movable supporting arm 85. The ring 153 is connected to the plate 139 by means of the rods 149 and 154 and is adapted to engage with the projecting lug 155 on the presser foot 122. It will now be evident by referring to Fig. 11, that when the needle is lifted out of the fabric 183 by the rotation of shaft 86 in a clockwise direction, the rotation of supporting arm 85 will cause the link 145 to pull on the link 144 and in consequence the plate 139 is pulled in a direction away from the fabric 123. This brings the tapered edge of the plate 139 in contact with the stud 138 which in turn causes the plates 132 and 133 to become separated and releases the tension on the thread. As the plate 139 is pulled away from the fabric 123 the rung 153 is also pulled away bringing it in contact with the lug 155 and lifting the presser foot 122.

Since the needle has also a rotary motion in addition to its reciprocatory and oscillatory motions, the loop taker or hook must also rotate with the needle about an axis coincident with the axis of barrel 10. Many of the well known forms of hooks or loop takers may be used in this machine, our preferred form, however, is the well known type of rotary hook provided with a bobbin case and bobbin such as is used in well known makes of overseaming machines. In this type, the hook makes two revolutions to one reciprocation of the needle. Referring to Figs. 18, 19, 20, 21, and 28, the hook 156 is fixed to the spindle 157 rotating in bearings in frames 174 and 175. The gear 159 fixed to spindle 157, meshes with gear 160 which is fixed to spindle 158 revolving in bearings in frames 174 and 175. The bevel gear 160ª, fixed to gear 160, revolves with same and meshes with bevel gear 161 which is fixed to shaft 162. The bevel gear 168, fixed to shaft 162, is driven by bevel gear 169 which is fixed to the longitudinal shaft 170 which as will be hereinafter shown is properly geared and timed with the needle driving shaft 67 so that the needle and loop taker work in proper stitching relation. The frame 173 which is the left hand portion of the frames 174 and 175 is provided with a hollow cylindrical end which rotates in bearings in the right hand upright of the frame 171, while the shaft 162 rotates freely inside of this cylindrical end of frame 173 and the left hand upright of frame 171. The gear 163 is fixed to the cylindrical end of frame 173 and meshes with the gear 164 fixed to spindle 176 rotating in frame 171. The bevel gear 165, fixed to gear 164 meshes with bevel gear 166 which is in turn fixed to shaft 167.

In the operation of the machine, shaft 170 causes the ordinary stitching rotation of the loop taker about the spindle 157. The shaft 167 rotates the plane of the loop taker in accordance with the rotation of the plane of oscillation of the needle bar. As the shaft 167 is rotated in either direction in unison with the shaft 46 which controls the rotation of the barrel 10, the frame 173 and its portions 174 and 175 together with the loop taker 156 are rotated correspondingly about 162 as axis. The needle or throat plate 124 being attached to the frames 174 and 175 is also rotated so that the needle slot 178 is always kept parallel with the plane of oscillation of the needle.

The plates 177 shown in Fig. 19 but omitted for clearness in Fig. 18 are used to connect the frames 173 and 174 rigidly and are made removable to permit of placing the bevel gear 161 on the shaft 162 in assembling the machine.

In producing open work embroidery by the machines in present use, the needles are stopped while the fabric frame is properly positioned in front of the punches, during the time the fabric is being perforated and till the fabric frame is again in its proper position in front of the needles. This results in a considerable loss of time. In our machine we have provided means whereby the punches are automatically thrown into operation without stopping the operation of the needles, the punches forming the hole while at the same time the needles stitch around it. Referring to Figs. 1, 2, 3, 7, 8, 9 and 10, the channel shaped guide 31 is provided with a circular hole fitting over pin 23 thus allowing it to swing about pin 23. The portion of the guide 31 fitting over pin 23 and its right hand end are flattened as shown in Figs. 1 and 7, the right hand end being provided with an inclined slot 35 as shown in Fig. 3. The sleeve 21 fitting inside the barrel 10 is provided with projecting pins 21$^a$ over which fit friction rollers 21$^b$ which slide in slots 21$^c$ of the barrel 10 so that the sleeve 21 can reciprocate inside the barrel 10 but is made to rotate with it. The bridge 9 fixed inside of the sleeve 21 is provided with a pin 36 which is adapted to engage with the inclined slot 35 of guide 31 so that as the sleeve 21 is shifted along the axis of the barrel 10, guide 31 is caused to swing about pin 23. The sleeve 21 is moved along the axis of the barrel 10 by the two driving plates 53 and 54 similar in principle and arrangement to the plates 47—48, 49—50 and 55—56. (See Fig. 11). The plates 53—54 are kept in line and are guided by the sleeves 204 and 205 fitting over the guide rods 59 and 60 respectively.

As will be explained hereinafter, the inclination of the guide 31 with the axis of the barrel 10 must bear a fixed relation to the amplitude of oscillation of the needle. It will be recalled that the shifting of the rod 112 by the shaft 117 varied this amplitude. Hence the position of the sleeve 21 along the axis of the barrel 10 is controlled by linking it to the rod 112. Referring to Figs. 11, 11$^a$, 11$^b$ and 15, the blocks 206 and 206$^a$ which are clamped between the driving plates 53 and 54 have a pin 212 fitting between them. The plate 54 is cut out at 54$^a$ to allow the link 207, which fits on the pin 212, to pass through. The rock lever 208 is pivotally connected to the lug 210 of frame 107 by means of the pin 209 (see Fig. 15) and has its upper end connected to the link 207 by the pin 213 while its lower end is connected by the pin 214 to the link 215 which is in turn connected by the pin 216 to the rod 112.

The punch bar 32, fitting into the guide 31 and holding the punch 185 by means of the screw 186 is provided with a slot 183 fitting over the pin 23, adapting it to reciprocate and to swing with the guide 31 about the pin 23. The sleeve 184 prevents the bar 32 from slipping out of the guide. The sleeve 20 fitting inside the barrel 10 is provided with projecting pins 20$^a$ over which fit the friction rollers 20$^b$ which slide in slots 20$^c$ of barrel 10, so that the sleeve 20 can reciprocate inside of the barrel 10 but is made to rotate with it. The bridge 33 fixed inside of sleeve 20 is provided with the circularly curved slot 33$^a$ having a radius equal to the distance between the pins 23 and 34 when the punch is in the fabric. The pin 34, which is fixed to the top of the bar 32 engages with the slot 33$^a$.

Referring to Figs. 3, 11 and 15, the sleeve 20 is reciprocated by the driving plates 51 and 52 whose sleeves 179 and 180 slide over the guide rods 58 and 61 respectively, the friction rollers 20$^b$ of the sleeve 20 fitting between the driving plates 51 and 52 which are similar in principle and arrangement to the plates 47—48, 49—50 and 55—56. The shaft 89 causes the reciprocation of the plates 51—52 and hence of the punch 185 through a system of links which are suitably arranged to cause reciprocation of the punch with a long enough stroke to reach the fabric and perforate it or to cause reciprocation with so short a stroke that the fabric is not perforated, in accordance with the design as called for by the record. Referring to Figs. 11, 12 and 15, the eccentric rod 189, fitting over the eccentric 188 fixed to shaft 89, is adapted to slide in the sleeve 191 pivotally held to the crank arm 193 by its projecting pin 192. The shaft 194 carries the crank arm 193 as well as other similar crank arms 193 at suitable intervals all along the length of the machine, eccentrics 188 and their connecting linkages occurring along the shaft 89 at corresponding intervals, there being preferably two eccentrics 188 with their linkages and crank arms 193 for each length of the driving plates 51—52. The upper part of the eccentric rod 189 is connected to one end of link 196 by the pin 195 and the other end of link 196 is connected by pin 197 to the rock lever 198 which swings on pin 199 fixed to the frame 107. The upper end of the rock lever 198 is connected by pin 200 to one end of link 201, and the other end of link 201 is connected by a pin 202 to the projecting tongue of plate 203 which is fastened to the driving plates 51. Since the fringe or stitching about the hole of an eyelet is usually a band of the overseaming type, our needle to produce it must oscillate as well as reciprocate. The points of entry of the punch into the fabric are controlled in accordance with the amplitude of this oscillation so that the fabric is cut away just clear of the stitching no matter how wide or how narrow the band of stitching is.

The eccentric 188 is so placed on the shaft 89 that the punch 185 is brought into the fabric 123 by the sleeve 20 only while the needle is on the opposite side of the longitudinal axis of the barrel 10 from the punch and when the needle returns to the same side of this axis that the punch is on, the punch is out of the fabric. Shaft 89 rotates at one half the speed of shaft 67. The punch 185 is aimed, by the guide 31 controlled in its inclination to the longitudinal axis of the barrel 10 by the rod 112, to enter the fabric just to one side of the band of stitching being formed by the needle. As the punch is reciprocated, while the fabric frame 128 is moved in accordance with the design as called for by the record, a series of overlapping perforations are caused in the fabric adjacent to this band of stitching.

When the crank arm 193 is in the position shown in Fig. 11, the rotation of the shaft 89 causes reciprocation of the punch 185 with a long enough stroke to reach and perforate the fabric 123; if it be now desired not to perforate the fabric, the crank arm 193 is turned by the shaft 194, controlled in its motion by the record, so that the sleeve 191 is brought near the upper end of the eccentric rod 189, reducing the distance between the pins 192 and 195. This reduces the length of stroke of the punch to a very small amount and prevents it from reaching the fabric.

Another form of mounting for the needle and punch, particularly useful in a single needle machine is as follows: (Figs. 46, 47, 48, 49, 50 and 51). The barrel 617 which is analogous to the barrel 10 described hereinbefore, is similarly supported in bearings permitting it to rotate. Fixed to the barrel 617 are the pivots 618 pivotally supporting the needle bar guide 619. The hollow needle bar 620 is adapted to reciprocate in this guide and to oscillate about the pivots 618 with it. The lug 621 on the needle bar 620 is adapted to slide in the slot 622 of the needle bar guide thus preventing relative rotation of the needle bar and the needle bar guide. At the right hand end of the needle bar 620 is fixed the cross piece 624 which is adapted to be held in the slots 625 of the outside sleeve 626. The sleeve 626 is adapted to be reciprocated along the barrel 617 by a forked lever (not shown) whose ends fit slidably in the groove 627. The needle bar guide 619 is caused to oscillate about the pivots 618 by means of the cams 628 fixed to the outside sleeve 629. As sleeve 629 is reciprocated by a forked lever (not shown) whose ends fit slidably in the groove 630, the roller 631, fitting rotatably over a projecting lug of the needle bar guide 619, is swung up and down about the pivot 618 as axis. The oscillation of guide 619 causes oscillation of the needle bar 620 and hence of the needle 632, and the reciprocation of the sleeve 626 causes the reciprocation of the said needle bar and with it the needle. The punch bar 633 carrying the punch 634 is adapted to reciprocate in the punch guide 635 which is pivoted upon one of the pivots 618. The lug 640 of the punch bar 633, fits into a slot in the outside sleeve 637. The reciprocation of this sleeve, by a forked lever (not shown) whose ends fit slidably in the groove 638, causes reciprocation of the punch at one half the frequency of that of the needle. As was explained earlier in this specification the points of entry of the punch into the fabric must vary as the amplitude of oscillation of the needle. This is accomplished by the cams 639 fixed to sleeve 629, and acting on roller 636 mounted on guide 635. The outline of these cams and its inclination for the right half of their length is the same as the cams 628. The outline of their left halves makes an equal but opposite inclination with the axis of barrel 617. Now when the sleeve 629 is in its extreme left position, the punch and needle are on opposite sides of the axis of the barrel and the sleeve 637 is timed to cause the punch 634 to enter the fabric. The inclination of the punch is slightly in excess of that of the needle, so that it cuts beyond the band of stitching being formed. The punch 634 is brought clear of the fabric again before sleeve 629, which is driven in accordance with the well known overseaming timing, is started on its motion to the right. At the extreme right of its stroke, the sleeve 629 causes the punch and needle to have inclination with the axis of the barrel on the same side of said axis. But in this position the punch is timed to be at the right end of its stroke, and it does not reach the fabric again until the sleeve 629 has moved to its left position, bringing the needle on the other side of the axis of the barrel. The gear 641 at the right end of the barrel causes its rotation in a similar manner to gear 44 shown in Fig. 11. The take up for the thread is placed just to the right of the barrel 617, (beyond the limits of the drawing) more or less concentric with the axis of the barrel. In this location the take up does not need to rotate with the barrel, the thread being led from the take up into the bore of the hollow needle bar 620.

The mechanism for stopping the operation of the machine should any thread break, is as follows: Referring to Figs. 28, 29 and 37, the plate 215 supported by guides 211 at suitable intervals along the machine is provided with a series of holes 216 spaced at intervals apart equal to the distance center to center of the barrels 10. The forked clamp 218, fixed to plate 215 is connected by pin 221 to link 220 which is in turn connected by pin 222 to the rock lever 223 pivotally supported on the guide 211 by pin 224. The eccentric rod 226 connected at one end by the pin 225 to the rock lever 223, is reciprocated by the eccentric 182 fixed to shaft 181, causing thereby horizontal reciprocation of the plate 215 as shaft 181 is rotated. The plate 217, having the tubes 227 fastened through it at points in line with the holes 216, is adapted to have the plate 215 to slide under it. The tumblers 228 fit into the tubes 227 and are kept from rotating by means of the guide screws 228$^a$ which are screwed into the tumblers 228 and protrude through slots in the tubes 227. The tumblers 228 are limited in their up and down movement by the screws 228$^a$ and the length of the slots in the tubes 227, the bottom of these slots extending far enough down to permit a tumbler 228 to fall into a hole 216 when it is brought into register with the bottom of a tube 227. The thread 236 for each needle is led from a spool in a cage 236$^a$ over the cylindrical casing 234 of the shaft 233. This casing is made preferably of wood surfaced with emery paper. The thread is passed over the casing 234 with one or two turns and on through the eye 228$^b$ of the tumbler 228, from whence it is led into the adjustable thread tube 237, which fits into a conical hole in the gear 44, and on into the thread tube 50 of the barrel 10, through the several thread controlling devices mentioned earlier in the specification, until it reaches the needle. During stitching the thread is pulled into the barrel and owing to the adhesion of the thread to the emery surface of the casing 234, exerts a turning movement on the shaft 233, whose bearings are adjusted to have sufficient friction to keep the thread taut enough to normally hold the tumblers 228 in their uppermost position. During the intervals between stitching the thread is held taut by the tension plates 132 and 133 (Fig. 2) and the friction of the bearings of the shaft 233. The shaft 233 with its casing 234 extends in a series of independent lengths along the entire machine.

If a thread should break while the machine is stitching, and the break occurred in that part of the thread not yet having reached the tension plates, the weight of the tumbler 228 affected would be sufficient in most cases to cause it to fall into its corresponding hole 216 when brought into register with its tube 227. When any thread is broken beyond the tension plates, the thread through the eye of the tumbler affected remains taut being held thus by the tension plates, until the neighboring unbroken threads engaging with the same length of shaft 233 as the broken one, owing to their normal feed into the barrel, rotate the shaft 233 a sufficient amount to slack the broken thread, permitting the tumbler affected to fall.

The plates 215 extend along the machine in a series of independent lengths corresponding to the series of lengths of the shaft 233. Corresponding to each length of the plates 215 is a plate 217, having corresponding connecting pieces 229 connected to the rod 232 which is also arranged along the machine in corresponding lengths to the plates 215 and 217 and is supported at suitable intervals to permit horizontal motion. Corresponding to each length of rod 232 is a knife switch 231 adapted normally to keep open the circuit between the terminals 231$^a$ and 231$^b$. As long as this circuit is open the record is allowed to feed past the tracker bar, but when a tumbler 228 has fallen into a plate 215 it pulls a plate 217 to the right and with it a corresponding length of rod 232 which pushes the switch 231 closed, stopping the feeding of the record and lifting the needles clear of the fabric as will be explained later.

The barrels 10 with their driving mechanisms are arranged along the machine in groups as was already explained, there being longitudinal shafts suitably connected at intervals to these groups. In order to have the resistance of the machine balanced, each group is connected to its driving shafts at a phase slightly behind its adjacent group, as for example the cams 68 for any two adjacent groups are fixed to shaft 67 in positions, a partial turn apart.

The power for driving the machine is furnished by the motor 285, (Figs. 26 and 37) which is connected by means of the flexible coupling 286 to shaft 287 supported in bearings 288, 289 and 290, which in turn are fastened to the supporting plate 479. On the armature shaft of the motor 285 is fixed the fly wheel 615. While this is a somewhat unusual construction, it is necessitated by the great changes of loading to which the motor is subjected, although this could be provided for to some extent by proper winding of the motor. The bevel gear 291, which is fixed to shaft 287, meshes with bevel gear 292 fixed to shaft 296 supported in the bearings 294 and 295. At the opposite end of shaft 296 is fixed gear 293, which meshes with gears 411 and 297 feathered to shafts 409 and 321 respectively. During the operation of the machine these gears are in continuous rotation. Shaft 409 carries the clutch 472 which is rigidly fixed to one end of it, said shaft being adapted to be given an axial displacement in addition to its rotation. This axial displacement is brought about by the cylinder 407 which controls the axial displacement of the short shaft 410 in alinement with shaft 409 and fastened to it by the coupling 408 which permits of independent rotation of the shafts but compels them to have the same axial displacement. Fig. 34 shows a cross section of a cylinder similar in all respects to cylinder 407 with the exception that cylinder 407 has no spring as shown at 590 on the slide valve rod 589. The cylinder 407 has a piston corresponding to the piston 588, which, in accordance with the variation in air pressure on either side of it as determined by the record and the selective mechanism, shifts the shaft 409 axially, and with it the clutch 472. Similarly the shaft 321 is shifted axially, through the coupling 322 by the piston and its rod of cylinder 323, controlling thereby the position of the clutch 316 which is rigidly fixed to the end of shaft 321. When the clutch 472 is in the position shown in Figs. 36 and 44, it engages with the clutch member 474 which is rigidly connected to shaft 433 as is also the gear 429. The gear 428, fixed to the short shaft supported in bearings 457 and 458 meshes with gear 429, the gear 427 being also fixed to this same short shaft as is likewise the rotating part of the selector 456 whose function and construction will be explained later. Gear 427 meshes with gear 425 which is fixed to one end of a short shaft supported in bearing 421, gear 422 which engages the rack 423 being fixed to the other end of this short shaft. The rack 423, which is connected to and moves the sliding frame 586, is adapted to slide through guides, one of which is shown at 424. The motion of the rack 423, due to the rotation of gear 422, causes the adjacent gear 426 which also engages with the rack 423 to rotate. Gear 426 is rigidly fixed to a short shaft supported in bearing 420, (Fig. 44) the other end of said shaft having gear 419 fixed to it. Idler gear 418 meshing with gear 419 (see also Fig. 37) in turn meshes with gear 417 fixed to a short shaft supported in bearings 470 and 471 this last mentioned shaft having also gear 413 fixed to it, which meshes with gear 412. Gear 412 is fixed to one end of a sleeve, loose on shaft 409, to the other end of which is fixed the clutch member 473. When the clutch 472 is shifted into engagement with the clutch member 473 the gear 426 becomes the driving gear and is rotated in the reverse direction from that just described, gear 422 being now driven by the rack 423. When the clutch member 472 is held in an intermediate position, out of engagement with the clutch parts 473 and 474, neither gear 422 nor 426 is the driving gear, the whole set of gearing being driven only by inertia. In this connection it can be stated, in order that the motion of the fabric frame may be a smoothly running motion, it may be necessary to weight some of the gears to cause them to act as fly wheels, or even to add a fly wheel say to shaft 433. The use of the double driving gears 422 and 426 eliminates the backlash which would be present when it is desired to retard or reverse the direction of the rack 423.

In a similar manner the clutch 316 controls the rotation of gears 308 and 309 which engage with the rack 310 connected to and moving the sliding frame 585. When the clutch 316 is in the position shown gear 309 drives, the train of connections being as follows: Gear 313 which is fixed to shaft 320 drives gear 312 which is fixed to the same short shaft as gear 314, the rotating part of the selector 315 being also fixed to this shaft. Gear 314 in turn drives gear 306 fixed to the same short shaft as gear 309. The motion of the rack 310 drives gear 308 fixed to one end of a short shaft supported in bearings 307 and 305, the said shaft having gear 302 fixed to its other end. Gear 302 drives idler gear 301 which in turn drives gear 300 fixed to the same short shaft as gear 299. Finally gear 299 drives gear 298 which is rigidly attached to the clutch member 316ª, both gear 298 and clutch member 316ª being free to rotate on the shaft 321. The cylinder 323 similar in all respects to cylinder 407 shifts the shaft 321 axially through the coupling 322 similar to the coupling 408.

The motion of the fabric frame 128 can be considered as the resultant of two rectangular component motions, one component being due to the horizontal motion of the sliding frame 585 and the other component, due to the horizontal motion of the sliding frame 586. In order that the stitching should be uniform a given number of stitches must always be made for a given length of resultant motion of the fabric frame 128. To accomplish this, the shafts 67 which cause the reciprocation of the needle and the shafts 170, which cause the rotation of the loop taker, must rotate in a predetermined relation to the resultant motion of the fabric frame 128. As will be explained hereinafter, this is not quite true for the shafts 170, due to the rotation of the axis of rotation of the loop taker as it turns in unison with the plane of oscillation of the needle.

It will be remembered that the shafts 320 and 433 are rotated in one direction or another depending upon whether their respective racks 310 and 423 move to the left or the right. (See Fig. 36.) In the former case the racks through the train of gears explained before drive the shafts, and the clutches 472 and 316 are in the positions shown in Fig. 36, shaft 287 being assumed as constantly driven in the direction indicated by the arrow opposite gear 439 which is fixed to shaft 287. When the racks must be moved to the right, the clutches 472 and 316 are in the opposite position from that shown in Fig. 36.

Gear 404 (Figs. 42 and 43) through the train of gearing to be described later drives both shafts 67 and 170, Figs. 11 and 28, the former causing the reciprocation of the needle and the latter the rotation of the loop taker. It is this gear that must be rotated at a rate bearing a predetermined relation to the resultant motion of the fabric frame.

In order that the rates of rotation of the shafts 433 and 320 may be utilized as arithmetical quantities, mechanism is introduced which transmits the rotation of these shafts always in one direction irrespective of their reversals of direction of rotation. Referring to Figs. 36, 42, 43, 44 and 45, the friction disk 430 is feathered to shaft 433 being compelled to rotate with it but capable of axial motion. One end of the spring 436 reacts against the collar 437 fixed to shaft 433, and the other end reacts against the friction disk 430 holding the said disk in frictional contact with the disk 431 which is loose on shaft 433 being held against axial displacement by the hub of gear 429. Fastened in the downwardly projecting lug of disk 431 is a flat spring 469 fixed to one end of the link 459 which is adapted to fit loosely between the guides 467. A slot in the other end of the link 459 engages with a pin fixed to the bell crank lever 460 pivoted at 465. The link 461 is pivotally connected to the bell crank lever 460 and to one end of the lever 462 which is pivoted at 464. The other end of the lever 462 fits into the lower forked end of the lever 450 which swings about the pivot 468 fixed to the support 466. The upper end of the lever 450 consists of a slotted fork which engages with projecting lugs on the toothed clutch 449. When shaft 433 rotates in the direction shown by the arrows in Figs. 43 and 45, owing to the friction between disks 430 and 431, there is a turning movement exerted on disk 431, causing the flat spring 469 to push the link 459 away from the observer (Fig. 45) which causes the end of lever 462 connected to link 461, to be pulled toward the observer. In moving from one extreme position to the other the lever 462 must pass over the hemispherical headed spring catch 463 normally pushing upward. Assuming that just before, the shaft 433 was rotating in the opposite direction from that shown and that the lever 462 was on the other side of the catch 463. When, upon shaft 433 rotating in the direction shown, the spring 469 is bent until it exerts enough pressure to cause the lever 462 to depress the catch 463 and to snap over it into the position shown. The function of the catch 463 and the spring 469 is to cause the clutch 449 to be snapped into its extreme positions and held there, much after the same manner as the shutter mechanism of some forms of camera. When the lever 462 is snapped into the position shown, the clutch 449 is snapped into engagement with the toothed hub of gear 446 which is loose on shaft 453, said shaft being supported in bearings 451 and 447. The clutch 449 is feathered to shaft 453. Gear 445 which is fixed to shaft 433 meshes with gear 446, and when the clutch 449 is in the position shown, which position it will assume when the shaft 433 rotates as indicated, the shaft 453 is rotated driving gear 452 which is fixed to it, in the direction shown by the arrow. Gear 441 which is loose on shaft 440 is driven by gear 452 rotating the link 442 rigidly fastened to gear 441. The link 442 carries around with it the differential or planetary gears 454 and 455 rigidly fixed to each other but loose on the link. In addition to the motion given to them by the link 442, the gears 454 and 455 are rotated by gear 444 fixed to shaft 433. Gear 455 meshes with gear 443 which is fixed to shaft 440 in alinement with shaft 433 but separate from it. According to the well known theory of differential gears, by having proper ratios of the various gears involved, when shaft 433 rotates in the direction shown and the clutch 449 is in engagement with gear 446 the shaft 440 is rotated in the direction shown by the arrows at gears 443 and 350 both of which are fixed to said shaft. If now the direction of motion of fabric frame 128 is changed and shaft 433 is rotated in the opposite direction, the disk 431 is turned so that the spring 469 pulls on the link 459 and the clutch 449 is snapped into engagement with the teeth of bearing 451 thereby fixing shaft 453 against rotation. Gear 446 then rotates idly and the link 442 is held against rotation. In this event gear 444, rotating in the opposite direction than shown by the arrow, drives gears 454 and 455 which in turn drives the gear 443 in the direction shown. Thus it can be seen that no matter in what direction shaft 433 rotates, shaft 440 always rotates in the same direction.

What has just been described in relation to shafts 433 and 440 holds true in a similar manner with shaft 320 and the direction of rotation of gears 337 and 334. No matter in which direction shaft 320 rotates, gears 337 and 334, which are fixed to the same short shaft always rotate in the direction indicated. The friction disk 317 through the links 583, 584, 585, 586 and 587 controls the position of the toothed clutch 328, which engages either with gear 326 or the bearing 329. While engaging with gear 326 which is driven by the gear 325 fixed to shaft 320 the gear 330 is rotated and drives gear 332 which rotates the link 346 carrying the differential gears 335 and 336 engaging respectively with gears 333 and 334. When the clutch 328 engages with the bearing 329, the gear 333 drives gear 334 directly through the gears 335 and 336.

Let "$a$" equal the rate of rotation of shaft 433 and "$b$" equal the rate of shaft 320 then the resultant motion of the frame 128 is proportional to $$\sqrt{a^2+b^2}.$$

A close approximation to this resultant, good enough for all practical purposes, is obtained by a combination of sets of differtial or planetary gears, involving functions of the sum and difference of the component rates (rates of rotation of shafts 433 and 320), viz.

$$\sqrt{a^2+b^2}=.2929(a-b)+.7071(a+b)=1.$$

Other functions than the sum and difference of the rotations of shafts 433 and 320 may be used in formulating an equation.

The mechanism will now be shown for adding and subtracting the rotation of gears 350 and 337 in accordance with the above formula.

The gear 351, which is fixed to shaft 348 supported in bearings 349 and 434, meshes with gear 350. Gear 347, fixed to shaft 348, meshes with gear 345 which is loose on shaft 339. Shaft 339 is supported in bearings 597 and 359 and carries the gear 340 fixed to it. The link 352, which carries the planetary gears 353 and 354, is rigidly fixed to gear 345 and rotates with it. These planetary gears are fixed to each other and are loose on the link 352, gear 353 meshing with gear 355 fixed to shaft 339 and gear 354 meshing with gear 356 fixed to shaft 358. Gear 338 fixed to shaft 339 meshes with gear 337, and gear 341, fixed to shaft 342 supported in bearings 360 and 344, meshes with gear 340. Gear 343, fixed to shaft 342, meshes with gear 361 loose on shaft 348. The link 363 is rigidly attached to gear 361 and rotates with it. The planetary gears 364 and 366 are rigidly fixed to each other and are loose on link 363, gear 364 meshing with gear 362 which is fixed to shaft 348 supported in bearings 349 and 434 and gear 366 meshing with gear 365 which is fixed to shaft 372 supported in bearings 367 and 373. The friction disks 368 on shaft 372, held in engagement by the reaction of spring 369 against collar 370, are similar in construction and action to the disks 430 and 431 already described. Depending upon whether shaft 372 is rotated in the direction shown or in the reverse direction, the link 588 is pushed or pulled, and through the links 589, 590, 591 and 476, moves the toothed clutch 477, which is feathered to shaft 375, into engagement with the hub 376 of gear 374 loose on shaft 375, or into engagement with the support 478. For shaft 372 rotating as indicated by the arrow next to gear 371, the clutch 477 is held in engagement with the hub 376. Gear 371 which is fixed to shaft 372 meshes with gear 374. Gear 382, which is fixed to shaft 375, meshes with gear 381 loose on shaft 385 and carrying the link 380. Loose on link 380, are the planetary gears 377 and 379 which are rigidly fixed to each other, gear 377 meshing with gear 475 fixed to shaft 372 and gear 379 meshing with gear 378 fixed to shaft 385. The bearings 386 and 387 support shaft 385 which carries gear 598 fixed to it. Meshing with gear 598 is gear 388 which is loose on shaft 358. Bearings 357 and 383 support shaft 358. The link 389, upon which the planetary gears 390 and 391 are loosely mounted, is fixed to gear 388. The gears 390 and 391 are rigidly fixed to each other, gear 390 meshing with gear 392 fixed to shaft 358 and gear 391 meshing with gear 393 fixed to shaft 394. Shaft 394 is supported in the bearing 395 and carries fixed upon it gear 396 which meshes with gear 397 fixed to short shaft 398. The bearings 399 support shaft 398. Shaft 401, supported in bearings 402 and 403, has gears 400 and 404 fixed upon it. Gear 400 meshes with gear 397 and gear 404 with gear 405.

The addition of the components is accomplished through the set of differential gears 353, 354, 355 and 356. By a proper choice of gear ratios, as the link 352 rotates in the direction shown by the arrow, assuming for the moment that gear 355 is stationary, gear 356 will be rotated in the opposite direction, as shown by its arrow. Assuming for the moment that the gear 345 and link 352 are stationary, then the rotation of gear 355 causes all the rotation of gear 356 which is rotated in the same direction as gear 355. By having a proper ratio of diameters between gears 347 and 345, one revolution of shaft 348 has an equal effect upon the rotation of gear 356 as one revolution of shaft 339, hence the rotation of gear 356 is a function of the sum of the rotations of gears 338 and 351. Similarly the subtraction of the components is accomplished through the set of gears 362, 364, etc. By a proper choice of gear ratios, as the link 363 rotates in the direction shown by the arrow, gear 365 is rotated in the opposite direction. Assuming the link stationary for the moment and only gear 362 rotating, then gear 365 rotates in the same direction as gear 362. By having a proper ratio of diameters between gears 340, 341, 343 and 361 one revolution of shaft 339 has an equal but opposite effect upon the rotation of gear 365 as one revolution of shaft 348. As it is desired to add the rotations of gears 356 and 365, a third set of differential gears (gears 392, 390, 391 and 393) is used. But as "$a$" may become greater than "$b$" or vice versa in accordance with the motion of the fabric frame 128, constant direction mechanism (disks 368, links 588, 589, etc., gears 371, 374, etc.) is placed in connection with shaft 372, which causes gears 378 and 598 always to rotate in the direction indicated by the arrow at gear 598. By a proper choice of gear ratios, gear 393 is made to rotate at a rate proportional to the expression $$[0.7071(a+b)+0.2929(a-b)],$$

which is for all practical purposes a rate directly proportional to the resultant motion of the fabric frame 128.

The train of connections between gear 404 and the shafts causing the reciprocation and oscillation of the needles and the rotation of the loop takers will now be described.

Gear 405 fixed to one end of shaft 523 meshes with gear 404. To the other end of shaft 523 is fixed gear 524 which meshes with gear 525 fixed to vertical shaft 526. See Figs. 36, 37, 38 and 39. To the upper end of shaft 526 is fixed gear 537 meshing with gear 536 fixed to shaft 540. In addition, shaft 540 carries fixed to it gears 538 and 541, gear 538 meshing with gear 539 fixed to the upper shaft 89 which causes the oscillation of the upper set of needles, and gear 541 meshing with gear 542 fixed to the upper shaft 67 which causes the reciprocation of the upper set of needles. To the lower end of shaft 526 is fixed gear 527 meshing with gear 528 fixed to shaft 529. In addition, shaft 529 carries fixed to it gears 530 and 532, gear 530 meshing with gear 531 fixed to the lower shaft 89 which causes the oscillation of the lower set of needles, and gear 532 meshing with gear 533 fixed to the lower shaft 67 which causes the reciprocation of the lower set of needles.

Before taking up the train of connections between gear 404 and upper and lower shafts 170 which cause the stitching rotation of the upper and lower sets of loop takers, it will be necessary to digress to describe the mechanism which causes and controls the rotation of the plane or position of oscillation, of the needle and the corresponding rotation of the axis of stitching rotation of the loop taker.

Referring to Fig. 18, for shaft 170 rotating in the direction indicated, the loop taker 156 rotates as shown by the arrow. Now when shaft 167, which controls the rotation of the axis of rotation of the loop taker 156, rotates, it rotates the frame 173 about shaft 162 as an axis causing this frame to be in effect the link of a set of differential gears, such as the link 352 shown in Fig. 43. When shaft 167 rotates in the direction indicated by the arrow, frame 173 in rotating (assuming for the moment that gear 161 is held stationary) causes the loop taker 156 to rotate in the same direction as that shown by the arrow, and vice versa, rotation of shaft 167 in the opposite direction to that shown causes rotation of the loop taker in the opposite direction to that shown by the arrow. Thus it is seen, that as the loop taker 156 is given its normal stitching rotation by shaft 170, in unison with the reciprocation of the needle, the rotation of shaft 167 adds or subtracts to the rotation of the loop taker, throwing it out of proper stitching relation to the reciprocation of the needle. In order to avoid this, differential gearing controlled in accordance with the rotation of shaft 167, is introduced between gear 404 and shafts 170, which will act to offset this loss of synchronism.

The location of the piston in cylinder 483, (Figs. 36 and 39), which is similar in all respects to cylinders 323 and 407, determines the rotation of shafts 167 as follows:—The piston of cylinder 483 is coupled by the coupling 485 to shaft 560 which is slidingly mounted in bearings 486, 601 and 602. Gear 438 which meshes with gear 439 fixed to shaft 287, is feathered to shaft 560. The male clutch parts 487 and 600 are fixed to shaft 560, rotating as well as moving axially with it, when the shaft is shifted by the piston of cylinder 483. The female clutch part 488 and the bevel gear 489 which meshes with the large bevel gear 480, are fixed to a sleeve supported in bearing 486 and loose on shaft 560. Similarly the female clutch part 599 and bevel gear 603 are fixed to a sleeve in bearing 601, the bevel gear 603 meshing with the large bevel gear 480. The latter sleeve is also loose on shaft 560. The large bevel gear 480 (Figs. 39 and 40) is fixed to the stub shaft 494 which also carries fixed to it gear 491 meshing with gear 492 fixed to shaft 495. Shaft 495 is supported by the bearings 549 and 550 and carries fixed to it at its upper end the small bevel gear 496, at its lower end the small bevel gear 522 and intermediate between gears 492 and 522, the bevel gear 508 which meshes with bevel gear 509 fixed to shaft 510. Bevel gear 496 meshes with the large bevel gear 497 fixed to the end of upper shaft 167. Adjacent to bevel gear 497 and on upper shaft 167 is the rotating part of the selector 498 whose function and construction will be described hereinafter. Bevel gear 522 meshes with large bevel gear 521 fixed to lower shaft 167.

When clutch part 487 engages with its mate 488, since shaft 560 is always driven by the motor 285 in the direction indicated by the arrow, (Fig. 36) the bevel gear 480 is driven in the direction shown by its arrow, and through the train of gearing just described, the shafts 167 are driven as indicated. Should the clutches be shifted and clutch part 600 brought into engagement with its mate 599, the direction of rotation of gear 480 and of shafts 167 is reversed from that shown. When the clutch parts 487 and 600 are not forced into engagement with either of their mates, shafts 167 are not driven in either direction except by inertia.

At the other end of shaft 510, (Figs. 36, 37, 38, 40 and 41) from gear 509, is fixed gear 511 meshing with gear 512 fixed to one end of shaft 513. Shaft 513 also carries fixed to it, gear 514 meshing with gear 515 loose on shaft 523. The support 556 furnishes a brace to the end of shaft 523 near gear 515 (Fig. 41). Fixed to gear 515 is the link 551 carrying planetary gears 516 and 517 loose upon it. Gears 516 and 517 are rigidly fixed to each other, gear 516 meshing with gear 552 which is fixed to shaft 523 and gear 517 meshing with gear 553 fixed to shaft 554. Bearings 555 and 557 support shaft 554 which carries bevel gear 520 fixed to its rear end. Gear 520 meshes with gear 481 (seen best in Fig. 38) fixed to the vertical shaft 490. Shaft 490 carries bevel gear 482 fixed to its upper end and bevel gear 518 fixed to its lower end. Bevel gear 482 meshes with its mate 483 fixed to upper shaft 170 causing rotation of the upper set of loop takers and bevel gear 518 meshes with its mate 519 fixed to lower shaft 170 causing rotation of the lower set of loop takers.

For the shaft 167 rotating as shown, if a compensating device were not used, the loop taker 156 would be increased in speed over that caused by shaft 170. By the train of gearing between gear 508 and gear 515 just described, the rotation of shaft 170 is modified in accordance with the rotation of shaft 167. For the rotation of shaft 167 as shown, gear 515 causes the link 551 to rotate in the same direction as shown for shaft 523. The differential gears 552, 516, 517 and 553 bear such ratios to each other that for gear 515 rotating as shown, assuming for the moment that gear 552 is stationary, gear 553 is rotated in the opposite direction to that shown for shaft 523 and just enough to offset the increased speed of the loop taker 156 due to the rotation of shaft 167. What happens in reality is that gear 553 is driven very rapidly by gear 552 through the gears 516 and 517 and as the link 551 slowly rotates in accordance with the rotation of shaft 167, gear 553 loses some of the speed it would have if link 551 were stationary, the loss being just enough to offset the increased rotation of loop taker 156. For shaft 167 rotating in the opposite direction to that shown, link 551 rotates in the opposite direction to that shown for shaft 523, this makes gear 553 go faster than it normally would, if driven from gear 552 alone, which increase is just enough to offset the decreased rotation of the loop taker 156 due to the rotation of shaft 167.

The train of connections between vertical shaft 495 (Fig. 39) and upper and lower shafts 46, which rotate in synchronism with the rotation of the axes of stitching rotation of the loop takers, the upper and lower sets of barrels 10 and hence the oscillating position of the needle, is as follows:—Fixed to shaft 495 is the bevel gear 493 meshing with its mate 499 fixed to one end of shaft 500. To the other end of shaft 500 is fixed bevel gear 502. Gear 502 meshes with its mate 501 fixed to vertical shaft 503. At the top of vertical shaft 503 is fixed bevel gear 504 meshing with its mate 505 fixed to upper shaft 46. To the lower end of shaft 503 is fixed bevel gear 506 meshing with its mate 507 fixed to lower shaft 46 (Fig. 37.)

The mechanism for controlling the variation of the amplitude of oscillation of the needles will now be described. Referring to Fig. 11, it will be remembered that the rotation of shaft 117 one way or other caused the sliding block 98 to be shifted accordingly in the groove 95 of the rock lever 91. There are two such shafts 117 one each for the upper and lower rows of needles. At the end of the upper shaft 117 (Figs. 36, 37 and 39) is fixed the counterweighted lever 568 pivotally fastened to the vertical link 565. The lower shaft 117 carries fixed to its end the lever 566 pivotally connected to the vertical links 565 and 564. The end of lever 566 away from shaft 117 carries fixed to it the moving part of the selector 567 to be described hereinafter (Fig. 35). The lower end of link 564 connects to the piston rod 563 of the pneumatic cylinder 561. This cylinder is the same as that shown in Fig. 34 except that the spring 590 is omitted.

The pressure chamber 594 (Fig. 34) is connected to the compression reservoir 604 (Fig. 37) by a pipe (not shown) through which it receives its supply of air at high pressure. The shifting of the slide valve 591 admits high pressure air to one side or the other of the piston 588 through port 592 or 593 according to the position of the slide valve 591, through port 593 for the particular case shown in the figure. Port 592 is shown here connected to the exhaust space 595. The shifting of the slide valve is controlled by the motion of the plunger 607 in the solenoid 577 which is variably energized in accordance with conditions to be described hereinafter.

As the piston of cylinder 561 which corresponds to piston 588 of Fig. 34 is shifted in cylinder 561, the shaft 117 is gradually rotated one way or the other, varying the amplitude of oscillation in accordance with the requirements of the design. The way the design as perforated on the record, controls the position of the piston will be described later. The piston of cylinder 561 is controlled for all its possible positions in the cylinder, contrary to the pistons which control the needle and punch lifts, which are controlled only in their end positions as will now be described.

It will be remembered, that the rotation of shaft 86 controlled the position of the needle 120 (Fig. 11). When shaft 86 holds the arm 85 in the position shown, the needle is adapted to stitch, but when shaft 86 turns the arm 85 to the right, the needle is lifted free and clear of the fabric even when it is in the extreme position of its reciprocation toward the latter.

To the end of upper shaft 86 is fixed the lever 582 (Figs. 36, 37 and 39) which is pivotally connected to the link 580. At the end of the lower shaft 86 is fixed the counterweighted lever 581 which connects pivotally with the lower end of link 580 and the upper end of link 579 which is pivotally connected at its lower end with the piston rod 578 of the pneumatic cylinder 569. The cylinder 569 is similar in all respects to cylinder 576 as shown in Fig. 34. The piston 588 of cylinder 576 as well as of 569 is adapted to have only the two extreme positions and to be thrown quickly from one end to the other. As solenoid 577 is energized, which takes place when the record calls for it, the slide valve rod 589 forces the slide valve 591 down against the resistance of spring 590. Upon deënergization of the solenoid, which is its normal condition, the slide valve snaps back. In the case of cylinder 569, when the solenoid 570 is energized, the piston is forced to the bottom of the cylinder, lifting the needles clear of the fabric, upon deënergization, the piston moves to the top bringing the needles into their normal stitching relation with the fabric.

In connection with the device for shortening the stroke of the punch so that it will not reach and perforate the fabric, it will be remembered (Fig. 11) that when shaft 194 holds crank 193 in the position shown, the punch 185 is adapted to perforate the fabric 123, but when crank 193 is rotated so as to bring pin 192 close to pin 195 the punch 185 has its stroke so shortened that it cannot reach the fabric.

To the end of upper shaft 194 is fixed the counterweighted lever 575 pivotally connected to the upper end of the vertical link 574, which at its lower end is pivotally connected to the upper end of link 572 and the lever 573 fixed to the end of lower shaft 194. The lower end of link 572 is pivotally connected to the piston rod 571 of the pneumatic cylinder 576. When the solenoid 577 is energized the piston 588 is forced to the bottom of cylinder 576, causing the crank 193 to assume the position shown in Fig. 11, which causes perforation of the fabric. Normally the solenoid 577 is not energized in which condition the piston 588 is held in its upper position, causing the punch 185 to reciprocate with so short a stroke as not to reach the fabric.

Both cylinders 569 and 576 are connected by tubes (not shown) to the compression reservoir 604 which receives its supply of air from the compression pump 605 (Fig. 37) driven by the belt 606 from shaft 287.

The extreme left end of shaft 181 (Figs. 28, 36 and 37) carries fixed to it a sprocket wheel 545 and fixed near the left end of shaft 89 is the sprocket wheel 544. Encircling both these sprocket wheels is the chain 543. As sprocket wheel 545 is made much larger than sprocket wheel 544, shaft 181 is rotated by shaft 89 at a rate considerably slower than its own rate. It will be remembered that shaft 181 (Fig. 28) rocked the levers 223 which cause the reciprocation of the plates 215 (Fig. 29) of the thread breaking mechanism.

Referring to Figs. 22, 23, 25, 26 and 27, the perforated record 241 is fed by being gripped between the two rotating rollers 242 and 243 while it is wound up on the take up spool 244 and unwound from the spool 245 passing over the plate 247 and the tracker ducts $d^1$, $d^2$, etc. The shaft $242^a$ is a continuation of the roller 242 and extends through the disk 246 which has an opening in it large enough to permit of the free rotation of the shaft. The disk 246, which is one part of a friction clutch, is attached to and braced by the frame 246$^b$ and is thus fixed against rotation. The mating part of this friction clutch, 246$^a$, is fixed to the hollow shaft 242$^b$, one end of which fits over the shaft 242$^a$ and rotates in a bearing in the frame 248 and in the bore of the solenoid 250 rigidly supported by the frame 249. The end of the shaft 242$^a$ is provided with a feather while the portion of the hollow shaft 242$^b$ fitting over same is provided with a groove on its inside fitting over the feather, so that the shaft 242$^b$ can move longitudinally over the shaft 242$^a$ but the two shafts rotate together. The plunger 251 of the solenoid 250 is fixed inside of the shaft 242$^b$. The disk 252 which is part of a friction clutch is fixed to the shaft 242$^b$ while its mating disks 252$^a$ is fixed to the shaft 253 rotating in the frame 254. The spring 255 normally by pressing against the frame of solenoid 250 and the clutch disk 246$^a$, forces the latter against the disk 246 at the same time causing the disengagement of the clutch disks 252 and 252$^a$, thus causing the shafts 242$^a$ and 242$^b$ and the roller 242 to be stationary. The motor 258 drives shaft 253 by means of the pulleys 258$^a$ and 256 and the belt 257. If the solenoid 250 is now caused to be energized, by means which will be explained later, the plunger 251 is drawn in toward the disk 252$^a$, pulling the shaft 242$^b$ with it. This causes the disks 246 and 246$^a$ to be disengaged, reacting against the spring 255, while the disks 252 and 252$^a$ become engaged, thus causing the shafts 242$^a$ and 242$^b$ and the roller 242 to rotate. It is therefore evident that in order to rotate the roller 242 and thereby feed the record, the solenoid 250 must be energized. The feed roller 242 revolves in bearings in frames 259 at each end. The upper parts of the frames 259 are provided with slot shaped openings in which the end pins of the idler roller 243 are adapted to rotate. The idler roller 243 (Fig. 22) is incased in a covering of rubber tubing 260. The thumb screws 262 which are tapped into the top parts of the frame 259 are adapted to bear down upon the end pins of the idler roller 243 and depending upon whether they are screwed up or down the grip between the rollers 243 and 242 is diminished or increased, thus permitting of a proper adjustment for feeding the record.

Referring to Figs. 26 and 27, the gear 263 which is fixed to the shaft 242$^a$ drives the idler gear 264 fixed to a stub shaft revolving in bearings in the frame 265. The gear 266 driven by gear 264 is fixed to the shaft of the take up spool 244 by a friction grip. The pin 268 passing through the lug 267 on the gear 266 and its hub, is pressed down against the shaft of spool 244 by means of the spring 268$^b$ compressed between the collar 268$^a$ of pin 268 and the lug 267. The pin 268 is held in engagement with the shaft of spool 244, when the cam lever 269 is turned as shown in Fig. 26, but when the lever is turned to be in line with the pin 268, gear 266 becomes loose on the shaft of spool 244. The cam lever 269 is moved manually into the latter position when it is desired to rewind the record on spool 245. After the record has been fed awhile the perimeter of the take up spool becomes enlarged by the layers of superimposed record in which case the take up action tends to become faster than the feeding of the record. Under this condition the gear 266 slips upon the shaft of the take up spool 244 compensating thereby for this discrepancy. The gear 270 fixed to the shaft 253 drives the gear 271 fixed to shaft 272 revolving in bearings in the supports 272$^a$ and 272$^b$. The gear 273, also fixed to shaft 272 drives gear 275 through the idler gear 274. Gear 275 is feathered to the toothed clutch 276 permitting the clutch to be moved through it axially and itself restrained from axial motion by the uprights 282. The clutch 276 is loose on shaft 277 which also carries the sleeve 278 loose upon it. The mating clutch part 276$^a$ to the right is fixed to the shaft 277, while the mating clutch part 276$^b$ to the left is fixed to the sleeve 278 which carries fixed upon it sprocket wheel 281$^a$. The rod 279 is screwed at its lower end into the top of clutch 276 while its upper end passes through a slot in lever 279$^a$. If the lever 279$^a$ is thrown toward the right the clutch 276 engages with its mating part 276$^a$ and the shaft 277 is rotated and consequently the exhaust pumps 280 are operated. If the lever is thrown to the left the clutch 276 engages with its mate 276$^b$ and sleeve 278 is rotated thereby. The rotation of sleeve 278, through sprocket wheel 281$^a$ and sprocket wheel 281$^b$ fast on shaft 245$^a$, and chain 281 encircling both sprocket wheels, causes the rotation of spool 245 for rewinding the record. The spool 245 is held to the shaft 245$^a$ by friction grip mechanism 245$^b$, similar to that for the take up spool 244. During rewinding this grip is used and during the regular feeding of the record it is released. The entire mechanism shown in Figs. 25 and 26 is inclosed in the casing 616 of Fig. 37.

The manner in which the perforations of the record control the operations of the machine are fully explained in the patents of Emanuel Scheyer, Nos. 1,172,058 and 1,172,059 heretofore mentioned. The tracker ducts $d^1$, $d^2$, $d^3$, etc., are each connected to a corresponding cylinder $e^1$, $e^2$, $e^3$, etc., and each cylinder is in turn connected to the exhaust chamber 281 through the tube 283 and a corresponding tube X.

Referring to Fig. 23 where a section of one of the cylinders $e$ is shown, $a$ and $b$ are two electric terminals separated from each other by insulation. The movable conducting disk $h$ is fixed to the piston $p$ which is normally kept at the bottom of the cylinder by the spring $s$ placed on the rod $r^2$ attached to the piston $p$. The spring $s$ reacts against the bridge $t$, which is provided with a large opening to permit the passage of air, and against the piston $p$. The conducting disk $h$ is insulated from the rod $r^2$. The space above the piston $p$ is connected by a tube X to the tube 283 and is thereby kept below atmospheric pressure. When a perforation passes over a tracker duct $d$, air at atmospheric pressure enters and forces a piston $p$ in a corresponding cylinder $e$ up against a spring $s$ until the disk $h$ comes in contact with the terminals $a$ and $b$ making an electrical connection between them. The leak-hole $f$ is so small in comparison with the tracker duct $d$, that the leakage through it will have very little effect against the forcing of the piston $p$ upward by the inrush of air at atmospheric pressure. When the perforation passes from the top of the tracker duct, and the solid part of the record covers it, the air below the piston $p$ is soon exhausted through the leak-hole $f$, to such an extent, that the spring $s$ forces the piston $p$ down, breaking the connection between the terminals $a$ and $b$.

A modified method of making and breaking the circuit between the terminals $a$ and $b$ is shown in Fig. 24. In this method, the most preferable form of record is made of sheet brass or similar material instead of paper. In Fig. 24 $a'$ and $b'$ correspond to the terminals $a$ and $b$, while the piece $247^a$ corresponds to the tracker board, the long groove $d'$ corresponds to the openings $d$, while the levers $e'$ correspond to the movable conducting pieces $h$. When the record sheet 241 is passing over the groove $d'$ and no perforation in under the point of the lever $e'$, it is held by the record out of the groove $d'$, and the circuit between the terminals $a'$ and $b'$ is broken. If a perforation now comes under the point of lever $e'$, it swings about pin $r'$ being pulled by spring $s'$, its point dropping into the groove $d'$ and the circuit between the terminals $a'$ and $b'$ is closed. As soon as the perforation passes beyond the groove $d'$, the lever $e'$ is raised and the circuit between the terminals $a'$ and $b'$ is broken again.

In Figs. 31 and 32 are shown a plan and section of a typical electrical selector of the several used in this machine. The contact arms or fingers $S^{44}$, $S^{45}$, $S^{46}$, $S^{47}$ and $S^{48}$ are fastened to a disk $S^{65}$, which is in turn fixed to the shaft T whose rotation it is desired to control by the record, and are insulated from each other by a layer of insulating material $S^{46a}$. The stationary portion of the selector, $S^{66}$ usually fastened to the supporting framework of the machine, is provided with a layer of insulation $S^{66a}$ of a shape as shown in Fig. 32 and is concentric with the shaft T. The slip rings $S^{49}$, $S^{50}$, $S^{51}$, $S^{52}$ and $S^{53}$, composed of conducting material are each fixed to disk $S^{66a}$, and are each electrically connected to a separate conductor as will be more fully explained in connection with Fig. 30. A series of terminals $c^1$, $c^2$, $c^3$, etc., are also attached to disk $S^{66a}$, are insulated from each other and each one is connected to a corresponding terminal $a^1$, $a^2$, $a^3$, shown as $a$ in the typical cylinder $e$ in Fig. 23. The arm $S^{44}$ is always in contact with the ring $S^{49}$, the arm $S^{45}$ with the ring $S^{50}$, the arm $S^{46}$ with the ring $S^{53}$, the arm $S^{47}$ with the ring $S^{51}$, and the arm $S^{48}$ with the ring $S^{52}$. Each arm is also in contact with some of the terminals $c^1$, $c^2$, etc.

In Fig. 30, the action of the selector and the connecting circuits are shown diagrammatically. The pieces marked $S^{44}$, $S^{45}$, $S^{46}$, $S^{47}$ and $S^{48}$ represent the correspondingly marked arms in Fig. 31, the areas marked $c^1$, $c^2$, $c^3$, etc., correspond to the terminals similarly marked in Fig. 31, the pieces marked $a^1$, $a^2$, $a^3$, etc., $b^1$, $b^2$, $b^3$, etc., and $h^1$, $h^2$, $h^3$, etc. represent the terminals $a$ and $b$ and the movable disk $h$ in Fig. 23, also the circles $e^1$, $e^2$, $e^3$, etc., represent the cylinders $e$ in Fig. 26. The number of terminals $c^1$, $c^2$, etc., are taken in multiples of 16 as shown from $C^1$ to $C^{16}$ and then repeated in cycles. The terminals marked $C^1$ are all electrically connected, all marked $C^2$ are connected to each other and so on, so that there are sixteen circuits with several multiples of terminals around the disk. The number 16 was chosen here for convenience, another number could have been used, provided the number of terminals included between the extremes of arms $S^{44}$ and $S^{48}$ is the minimum.

It will be recalled in the description of the mechanism for moving the fabric frame 128, that the moving part of the selector 456 (Fig. 36) was fixed to the same short shaft as gear 428 and the moving part of the selector 315 was fixed to the same short shaft as gear 312. In connection with the mechanism for rotating the plane of oscillation of the needle and the plane of rotation of the loop taker, the moving part of the selector 498 was fixed to shaft 167. The "moving part" of these selectors is none other than a disk $S^{65}$ with its selector arms $S^{44}$, $S^{45}$, etc., (Figs. 31 and 32). The moving part of the selector 567 (Figs. 35, 37 and 39) of the mechanism for varying the amplitude of the oscillation of the needle, consists of the end of the lever 566 having the selector arms $S^{44}$, $S^{45}$, etc., fixed to it and insulated from it and from each other. Each arm is bent so as to come in contact only with its corresponding slip ring, $S^{44}$ with $S^{49}$, $S^{45}$ with $S^{50}$, $S^{46}$ with $S^{53}$, $S^{47}$ with $S^{51}$ and $S^{48}$ with $S^{52}$. The slip rings of all the selectors used are fixed to stationary parts of the machine.

The cylinders 323, 407, 483 and 561 correspond consecutively to selectors 315, 456, 498 and 567 and depending upon the position of their pistons the moving parts of the selectors and the shafts to which they are fixed (in the case of selector 567, the lever 566) are moved in one direction or the opposite as was explained before. Referring to Fig. 34 which is typical (with the exception of spring 590) of all the cylinders just mentioned, it can be seen that the position of the piston 588 depends upon the position of the slide valve 591 which in turn depends upon the position of the plunger 607 in the solenoid 577. The solenoids 324, 406, 482 and 562 corresponding to cylinders 323, 407, 483 and 561 are wound so as to have shifting centers of magnetism under the influence of the record and their corresponding selectors. This shifting of the center of magnetism causes corresponding motion of the plungers of the solenoids and hence of the pistons of their corresponding cylinders. The solenoid S in Fig. 30, which is typical of those just mentioned, is composed in reality of three separate solenoids adjacent to each other, wound on a common core, viz. $S^a$, $S^b$ and $S^c$. The plunger of a set of solenoids $S^a$, $S^b$, $S^c$ is drawn into one or another of them in accordance with which solenoid is transmitting the current at any time.

Fig. 33 shows a partial view of the perforations in the record passing over a set of tracker ducts for a component motion, known as a unit element in the pending applications mentioned above. Consider the unit element driving rack 423 (Fig. 36) as typical. For illustration, it will be assumed that at a certain instant, rack 423 is in such a position that the arms of the selector are in the position shown in Fig. 30, viz. $S^{45}$ at $C^6$ and $C^7$, $S^{46}$ at $C^8$, etc., and the record in such a position that a perforation is at tracker duct $d^9$. This will close the circuit between the terminals $a^9$ and $b^9$ by means of air at atmospheric pressure, forcing up the piston $p$ as shown in Fig. 23. The circuit shown by arrows $m$ is then closed, viz.; from source A (assuming the gap at $r$ to be closed) through solenoid $S^b$, then through electromagnet $M^b$, the function of which will be explained later. It then follows from the arm $S^{47}$ to the terminal $C^9$, then to terminal $a^9$ passing next to terminal $b^9$ and from there to source A. As the solenoid $S^b$ is energized its plunger is drawn into it which causes clutch 472 to assume the opposite position from that shown in Fig. 36, as explained before, causing the rack 423 to be sent to the right. As the record 241 continues to feed, the second perforation comes over the next tracker duct and in the same manner as before, contact is made between terminals $a^{10}$ and $b^{10}$. As the rack moved to the right due to the connection between terminals $a^9$ and $b^9$ the arms of selector 456 also moved so that the selector arm $S^{47}$ now covers the terminals $c^{10}$ and $c^{11}$ so that the circuit is completed, and the current in circuit $m$ is flowing again, and as before the rack 423 is sent still farther to the right, and arm $S^{47}$ then covers terminals $c^{11}$ and $c^{12}$. The third perforation now passes over the duct $d^{11}$, making connection between the terminals $a^{11}$ and $b^{11}$, causing motion of the rack to the right again, and bringing arm $S^{47}$ in contact with the terminals $c^{12}$ and $c^{13}$. At the same time the other arms $S^{44}$, $S^{45}$, $S^{46}$, and $S^{48}$ travel along in the same relative positions to arm $S^{47}$. The fourth perforation also passes over the duct $d^{11}$, connecting the terminals $a^{11}$ and $b^{11}$. The arm $S^{46}$ is now on terminal $c^{11}$ the one connecting with terminals $a^{11}$ and $b^{11}$. This causes a current to be sent through the circuit marked $n$, viz.; from a source A (assuming the gap $r$ to be closed) through the solenoid $S^c$, then electromagnet $M^c$ to arm $S^{46}$, to terminal $c^{11}$, to terminal $a^{11}$, to terminal $b^{11}$ and then back to source A. When the current flows through the circuit $n$ the plunger is brought to the center of solenoid $S^c$. This releases the pressure between the clutch part 472 and either of its mates 473 and 474 with which it was last in engagement, thereby imparting no motion to the rack 423. The arm $S^{45}$ is now at terminals $c^9$ and $c^{10}$. As the record continues to feed, the fifth perforation now passes over the duct $d^{10}$. This makes connections between the terminals $a^{10}$ and $b^{10}$, and the circuit is completed with arm $S^{45}$; a current $k$ is now flowing from source A to solenoid $S^a$ (assuming the gap $r$ to be closed), through electromagnet $M^a$ to arms $S^{45}$, to terminal $a^{10}$, to terminal $b^{10}$ and back to source. The center of magnetism is now in solenoid $S^a$ causing the clutch part 472 to engage with its mate 474 and thereby driving the rack 423 to the left. The arm $S^{45}$ is now brought over terminals $c^8$ and $c^9$. The sixth perforation sends the current through the terminals $a^9$ and $b^9$, and the arm $S^{45}$, and the rack is sent still farther to the left. The motion of the rack to the right and to the left is continued according to the successive positions of the perforations in their passage by the ducts.

In Fig. 33, the perforations are shown spaced with an interval between them in the direction of feed of the record as well as across the sheet. The preferred form is to space the perforations with an overlap in the direction of travel of the record, although the drawing shows the contrary, for the sake of clearness in showing the individual perforations. The effect of overlap is that there is always an air cylinder $e$ with its terminals connected. A similar effect can be obtained by making the tracker ducts long enough in the direction of feed of the record so that there is always a new perforation coming over the ducts before the old one is leaving them.

Instead of arranging the tracker ducts as shown, in an order corresponding to the order of their corresponding terminals at the selector, the preferred way is to separate at the tracker board, corresponding ducts of adjacent terminals at the selector as widely as possible. The method illustrated in Figs. 30 and 33 was shown for simplicity of description. Fig. 26 illustrates one arrangement, of the many possible, for staggering the ducts $d^1$, $d^5$, $d^{13}$, etc. As seen in Fig. 33 if the ducts are arranged in the order shown there, a line of weakness will be found in the record for each unit element of the machine, rendering it liable to tear, particularly if paper is used. By scattering the tracker ducts of adjacent terminals about and perforating the record accordingly in recording, the operation of the machine is unchanged and weakening of the record is prevented. Another way to prevent weakening of the record is to make the tracker ducts long in the direction of feed of the record so that the perforations can have a considerable interval between them and still give the overlapping effect.

The explanation of the perforations and their effect so far have been for one unit element; in order that the four unit elements of the machine (the two for moving the fabric frame 128, the one for rotating the plane of oscillation, and the one for varying the amplitude of the oscillation) should be controlled simultaneously, the perforations corresponding to the several unit elements are placed abreast of each other. Then as the record is fed, the several unit elements act together, each bringing about its component motion, the combination is the resultant desired.

The relations between perforations, tracker ducts, air cylinders $e$ and selectors are similar for the several unit elements.

In Fig. 30 the arms $S^{44}$, $S^{45}$, etc., are shown covering adjacent terminals $c$ and in Fig. 31 they are shown on terminals of different cycles but adjacent groups. These two arrangements are identical in respect to the control of circuits. In the circular selector of Fig. 31, this is done because the size of the arms is too great to place them on adjacent terminals.

It will be remembered (Figs. 25 and 26) that when the solenoid 250 was energized, the record was fed because of the engagement of the clutch parts 252 and 252$^a$. The current used in energizing the solenoid 250 has in circuit the armatures AA and plates P of the four electro-magnets $M^1$, $M^2$, $M^3$ and $M^4$ all connected in series. This circuit will be known as the auxiliary circuit. There is one electro-magnet for each unit element controlled by the record, making four in all. In order to close the auxiliary circuit everyone of the magnets $M^1$, $M^2$, etc., must be energized, then the armatures AA are brought in contact with plates P. If the current through any one of the magnets is stopped, the armature AA is released, the spring 284 pulling it up and the auxiliary circuit is broken.

Each one of these electro-magnets is in reality a magnet composed of a single core wound with three separate insulated helices which are shown as $M^a$, $M^b$ and $M^c$ in Fig. 30. A current through any one of these helices keeps its magnet energized. It will be recalled that in tracing the circuits $k$, $m$ and $n$ causing motion of the rack 423 in one direction or another, they were made to pass through either helix $M^c$, $M^b$ or $M^a$ and in such event the record continues to feed. If now a circuit be made such that no current will flow through either helix $M^a$, $M^b$ or $M^c$, the auxiliary circuit will be broken, the solenoid 250 will be deënergized and the record will stop.

Let it be assumed that something, such as inertia, is retarding the motion of the rack 423 causing it to lag behind the motion called for by the record as it continues to feed. Assuming the record in the position shown in Fig. 33 and the arms of the selector in the position shown in Fig. 30, and that the first perforation has just passed over the tracker duct $d^9$. Now if the driving mechanism fails to respond, the arm $S^{47}$ remains on the terminal $c^9$ when the second perforation comes over the duct $d^{10}$. If there is still no response when the third perforation comes over the duct $d^{11}$, the circuit through arm $S^{48}$, the terminals $c^{11}$, $a^{11}$ and $b^{11}$, or the circuit $o$ is closed, viz.; from source A (considering the gap $r$ to be closed) through solenoid $S^b$ to arm $S^{48}$ to terminal $c^{11}$, to terminals $a^{11}$ and $b^{11}$ back to source. It will be noted that no current flows through either helix, $M^a$, $M^b$ or $M^c$. This releases the armature AA, breaking the auxiliary circuit and the record is stopped, while at the same time because the current is flowing through the solenoid $S^b$, the rack 423 is moved to the right. This allows the driving mechanism to catch up with the record. As the travel of the rack continues, it brings the arm $S^{47}$ up to terminal $c^{11}$ once more, causing the current to flow through the circuit $m$, as the perforation remained over the duct $d^{11}$. This sends the current through the helix $M^b$, closing the auxiliary circuit and starting the record again.

Now, consider again the position of the arms as shown in Fig. 30 and the first perforation in Fig. 33 just over the tracker duct $d^9$. If the driving mechanism should run away from the record, and pass through the neutral position, and beyond, the arm $S^{45}$ coming into contact with terminal $c^9$ closes the circuit $k$. This causes the plunger to be drawn into the solenoid $S^a$ and the result is a reverse driving motion to the left, bringing the arm $S^{46}$ over the terminal $c^9$. The neutral circuit $n$ is thereby closed. Then as the second perforation comes into line the machine takes up its normal travel.

If the drive should lag behind or run away from the record entirely, no arm would be in circuit with the contacts of that tracker duct energized by the perforation passing over it. In this connection, no current passes through the magnets M nor the solenoid S. This stops the driving action on the machine and the feeding of the record. In order to start the machine now, the parts must be brought into proper position by hand. In order to locate the position of the machine for the corresponding position of the record, the position of the various unit elements will be marked on the record at stated intervals to correspond with marks on the machine.

The use of the arm $S^{44}$ and the circuit $p$ is similar to the arm $S^{48}$ and the circuit $o$, except it is for motion in the opposite direction.

We do not limit ourselves to the system of circuits herein described. There are many systems which can be used to accomplish the same control.

Instead of using a selector with a plurality of arms, as shown, one selector arm can be used in combination with sets of gaps in the circuits $k$, $m$, $n$, $o$ and $p$ as shown at $a^1$, $b^1$, $a^2$, $b^2$, etc., Fig. 52, and adapted to be closed by the record. The gaps and their corresponding circuits of a set are kept insulated from each other, even when closed by the record. Another gap in these circuits is at the selector and is adapted to be closed by the single selector arm $S^{46T}$. For example where a perforated record and tracker ducts are used, for each tracker duct and its cylinder is a set of gaps, the gaps at $a^1$, $b^1$, Fig. 52, corresponding to tracker duct $d^1$, the gaps $a^2$, $b^2$ to duct $d^2$, etc. Each set is composed of gaps connected with corresponding terminals at the selector. These gaps correspond with and are connected to the terminals that would be covered by the selector arms, $S^{44}$, $S^{45}$, $S^{46}$, $S^{47}$ and $S^{48}$, if they were used, considering the neutral arm $S^{46}$ at the terminal corresponding to the tracker duct considered. Each of the gaps is in one of the circuits, $k$, $m$, $n$, $o$ and $p$, depending upon which of the selector arms would rest upon its corresponding terminal if the method of Fig. 30 were used, excepting that the arms $S^{47}$ and $S^{48}$ must be considered in the positions occupied by $S^{45}$ and $S^{44}$ respectively, and that $S^{44}$ and $S^{45}$ are in the positions shown for $S^{47}$ and $S^{48}$. The diagram shown in Fig. 52, for the sake of simplicity is based on a multiple arm selector in which each arm covers only one terminal, when arm $S^{46}$ is in the position shown in Fig. 30. This gives five gaps for each tracker duct as shown at $a^1$, $b^2$, $a^2$, $b^2$, etc., Fig. 52. To get an equivalent one arm selector to that shown in Fig. 30 would require nine gaps at $a^1$, $b^1$, etc. For example consider the duct $d^8$. The cylinder and its piston corresponding to duct $d^8$ when actuated by the record, closes the set of gaps at $a^8$, $b^8$, Fig. 52, consisting of a gap in circuit $n$ corresponding to terminal $c^8$, a gap in the circuit $k$ corresponding to $c^9$, a gap in circuit $p$ corresponding to $c^{10}$, a gap in circuit $m$ corresponding to $c^7$ and a gap in circuit $o$ corresponding to $c^6$. The one selector arm used $S^{46T}$, as it passes over any of these terminals completes the circuits $k$, $m$, $n$, $o$ and $p$ at the selector, depending upon its position at any time, in a manner similar to the arms $S^{44}$, $S^{45}$, $S^{46}$, $S^{47}$ and $S^{48}$.

That there is a corresponding change of motion of the unit element for each change of position of the plunger of solenoid S, is true only in a theoretical sense and is a useful assumption for the purpose of illustration. Owing to inertia and other factors inherent in the mechanism, the changes of motion of the unit element lag behind the changes of position of the plunger. This has the advantage of steadying the motion of the unit element, resulting in a smoothly running motion, permitting gradual changes in speed and direction. That the record is stopped every time the record and a unit element get out of synchronism by more than the allowed limit of error, is true only in the theoretical sense. Most of the time, owing to inertia and the slippage of the clutches feeding the record, the feeding motion is only retarded, and when the unit element and record come into unison, the retarding action of the clutches is changed to one of driving. The amount the position of the unit element can deviate at any time from the corresponding position called for by the record (the allowed limit of error) depends upon the number of terminals $c$ contacted with at one time by selector arms individually and collectively. It also depends upon the number of terminals $c$ passed over by the selector arms per a unit amount of motion of the unit element, that is the degree of fineness into which the path of the unit element is divided.

It will be recalled (Figs. 34, 37 and 39) that in order to lift the needles out of the fabric it was necessary to energize solenoid 570. Except in the case where a thread is broken, this lifting action is controlled by the record. The tracker board (Fig. 26) has a pair of tracker ducts N¹ and N² with corresponding cylinders e and terminals Nᵃ and Nᵇ (Fig. 30). The terminals Nᵃ and Nᵇ to the left of Fig. 30 correspond to tracker duct N¹ and those to the right of the figure to duct N². As long as there is a perforation of the record opposite duct N¹ or N² there is a current flowing through the solenoid 570. The switch 613, which is normally open is adapted to be closed manually whenever it is desired to lift the needles from the fabric independently of the record. The switch 231 is also normally adapted to be open except upon the breaking of a thread as explained in connection with Fig. 29. As the needles may be required to be held out of the fabric for a considerable length of time, in order to prevent weakening of the record sheet a double line of perforations is provided, one line for duct N¹ and the other for duct N², and the record is made having alternately a perforation for duct N¹ and duct N² these perforations overlapping each other in the direction of the feed of the record so that there is an uninterrupted flow of current through the solenoid 570 as long as it is desired to withhold the needles from the fabric.

In a similar manner ducts P¹ and P² and corresponding perforations of the record control the connections between two pairs of terminals Pᵃ and Pᵇ. As long as there is a perforation of the record opposite either duct P¹ or P² the punches are actuated, since there is a current flowing through the solenoid 577. Switch 612 which is normally open is adapted to be closed manually whenever it is desired to lift the punches clear of the fabric, which occasion would arise if the machine were stopped at a time when they were in the fabric and it would be desired to shift the fabric frame.

Should a thread break, switch 231 would be closed, closing circuits w and z. The current in flowing through circuit w, flows from the source A through electro-magnet 608, resistance y, switch 231 and back to source. When electro-magnet 608 which is located in the control box 616, is energized, it attracts an armature 609, fixed to the rod 614, against the resistance of spring 610, which normally keeps the conducting piece 611, carried by rod 614, down so as to close the gap r. The energization of electro-magnet 608 by the breaking of a thread opens the gap r, shutting off the operation of the whole machine excepting circuit z which carries the current for energizing solenoid 570, holding the needles clear of the fabric. In passing through circuit z the current flows from the source A through solenoid 570 through switch 231 back to source.

The operation of the machine is as follows:—A perforated record 241 marked in accordance with the desired design is pulled between the rolls 242 and 243 (Figs. 22 and 26) and caught on the spool 244. The motor 258 is set in motion after motor 285 has attained its working speed, starting the record on its feed. Before starting the record, the fabric frame 128 is brought to a predetermined zero position as well as the mechanisms for controlling the amplitude of oscillation and the rotation of the plane of oscillation. In accordance with the successive positions of the perforations of the record in their passage by the tracker ducts d¹, d², etc., the fabric frame is moved in accordance with the desired design. The motion of the fabric frame through the train of connections shown in Figs. 37 and 43 causes the stitch forming mechanism to operate so that a predetermined number of stitches are formed per unit resultant motion of the fabric frame. A set of perforations also controls the rotation of shafts 117 (Fig. 39) which vary the amplitude of oscillation, and another set of perforations acting upon intervening mechanism, controls the position of the clutches 487 and 600 which in turn control the rotation of shafts 167 and 46, controlling the plane of rotation of loop takers 156 and the rotation of barrels 10 (Fig. 28). And whenever it is necessary to shift the fabric frame from one figure of the design which has just been completed to another figure to be started, still other perforations control through solenoid 570, the rotation of shafts 86 which lift the needles 120 clear of the fabric and introduce them into it again at the correct time to start the new figure, the lifting of the needles automatically releasing the tension on the thread, by separating the tension plates 133 and 132, (Figs. 2 and 11). Whenever the design calls for open work, perforations are provided to energize solenoid 577 which by causing a partial rotation of shafts 194, causes the punches to become active, as long as it remains energized.

Instead of using the train of direct mechanical connections, our preferred form, illustrated in Fig. 43, between the mechanism for moving the fabric frame and the mechanism driving the stitch forming mechanism, we can control the number of stitches per unit length of travel of the fabric frame by perforations in the record. A unit element, similar to the one for controlling the rotation of the plane of oscillation of the needles, can be used to control the rotation of shafts 67, 89 and 167 with selector arms placed on a counter shaft revolving at a very much slower rate than these shafts.

By the expression "oscillating position" as used in the appended claims, we mean the locus of the point of the needle, projected upon the plane of the fabric, between two successive extreme positions of the needle as it oscillates. We use this expression because we do not limit ourselves to a needle which oscillates only in a plane, because by using a needle which oscillates about a pivot perpendicular to the plane of the fabric (a common form of mounting in existing overseaming sewing machines) and making modifications evident to anyone familiar with the art, to the adjacent mechanism, we can construct an overseaming stitching mechanism adapted in a generic sense to have its oscillating position rotated, as against the more specific sense applicable only to our preferred form in which the plane of oscillation is adapted to be rotated.

By the expression "unit element" as used in the claims, is meant a component mechanism, (not including its corresponding portion of the record) for controlling a function of the machine, such as the mechanism for controlling the varying of the amplitude of oscillation of the needle, or each one of the mechanisms controlling the motion of the fabric frame. The word "energy" as used is to embrace the idea of electrical energy and that form of mechanical energy which is transmitted by means of fluid substances. The words "marked," "marking," "marks" and "mark" are to include the idea of perforation, and the words "terminal" and "terminals" the idea of the termination of tubes or passages for the flow of fluid as well as of electric terminals.

Having thus described our invention, we claim as new, and wish to secure by Letters Patent:—

1. In a sewing machine, the combination of a needle, a mounting for same suitably constructed to permit reciprocation and oscillation, mechanism for causing said reciprocation and oscillation, coöperating stitch forming mechanism, a fabric frame suitably mounted to have motion, and mechanism for causing translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

2. In a sewing machine, the combination of a needle, a mounting for same suitably constructed to permit reciprocation and oscillation, mechanism for causing said reciprocation and oscillation, mechanism for varying the amplitude of said oscillation, a fabric frame suitably mounted to have motion and mechanism for causing translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

3. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, mechanism for varying the amplitude of said oscillation, mechanism for causing rotation of said oscillating position in reversible directions, a fabric frame suitably mounted to have motion and mechanism for causing translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

4. In a sewing machine, the combination of a needle, a mounting for same suitably constructed to permit reciprocation, oscillation about an axis parallel to the plane of the fabric, and rotation of the axis of oscillation of the needle in a plane parallel to the plane of the fabric, coöperating stitch forming mechanism, mechanism for causing the reciprocation and mechanism for causing the oscillation of the needle, mechanism for varying the amplitude of said oscillation, mechanism operatively connected to the mounting of said needle, for causing said rotation of the axis of oscillation in reversible directions, mechanism for causing the synchronous positioning of said coöperating stitch forming mechanism to suit said rotation of the axis of oscillation, a fabric frame suitably mounted to have motion, and mechanism suitably constructed to cause translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

5. In a sewing machine, the combination of a needle, a needle bar for carrying said needle, a guide piece for said needle bar permitting reciprocation of said bar relative to it, a mounting suitably constructed to support, pivotally, said guide piece, permitting oscillation of said guide piece parallel to a plane perpendicular to the plane of the fabric, the said mounting being suitably supported to be rotated about an axis perpendicular to the plane of the fabric, mechanism operatively connected to said mounting to rotate it in reversible directions, coöperating stitch forming mechanism, mechanism for causing the synchronous positioning of said coöperating stitch forming mechanism to suit the rotation of the axis of oscillation of the needle, a fabric frame adapted to have motion, mechanism suitably constructed to cause translation of said frame in all directions in a plane, said mechanism consisting of at least two component parts, each component part adapted to cause motion of said frame in reversible directions along the line predetermined for said component and mechanism for causing reciprocation of said needle bar, said reciprocation being controlled in accordance with the motion of the frame resulting from its combined motions along said components.

6. In a sewing machine, the combination of a needle, a mounting for same suitably constructed to permit reciprocation, oscillation and rotation of the oscillating position of the needle, a rotating loop taker coöperating with said needle, mechanism for causing the reciprocation and mechanism for causing the oscillation of the needle, mechanism for causing rotation of said oscillating position in reversible directions, mechanism for causing the synchronous positioning of said loop taker to suit the rotation of said oscillating position, a fabric frame suitably mounted to have motion, and mechanism suitably constructed to cause translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

7. In a sewing machine, the combination of a needle, a mounting for same suitably constructed to permit reciprocation, oscillation, and rotation of the oscillating position of the needle, a rotating loop taker coöperating with said needle, mechanism for causing the reciprocation and mechanism for causing the oscillation of the needle, mechanism for varying the amplitude of said oscillation, mechanism for causing rotation of said oscillating position in reversible directions, mechanism for causing the synchronous positioning of said loop taker to suit the rotation of said oscillating position, a fabric frame suitably mounted to have motion, and mechanism suitably constructed to cause translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

8. In a sewing machine, the combination of a needle, a mounting for same suitably constructed to permit reciprocation, oscillation about an axis parallel to the plane of the fabric, and rotation of the axis of oscillation of the needle in a plane parallel to the plane of the fabric, a rotating loop taker suitably mounted to have its stitching rotation about an axis parallel to the plane of the fabric, the said axis of stitching rotation being suitably supported to be rotated in a plane parallel to the plane of the fabric, mechanism for causing the reciprocation and mechanism for causing the oscillation of the needle, mechanism for varying the amplitude of said oscillation, mechanism for causing the rotation of the axis of oscillation of the needle and simultaneously the rotation of the axis of stitching rotation of the loop taker, a fabric frame suitably mounted to have motion, and mechanism suitably constructed to cause translation of said frame in all directions in a plane, said mechanism consisting of at least two component parts, each component part adapted to cause motion of said frame in reversible directions along the line predetermined for said component, said reciprocation being controlled in accordance with the motion of the frame resulting from its combined motions along said components.

9. In a sewing machine, the combination of a needle, a mounting for same suitably constructed to permit reciprocation, oscillation, and rotation of the oscillating position of the needle, a rotating loop taker, coöperating with said needle, adapted to have its stitching position rotated in accordance with the rotation of the oscillating position of the needle, mechanism for causing simultaneously the reciprocation of the needle and the stitching rotation of the loop taker, mechanism for causing the oscillation of the needle, mechanism for varying the amplitude of said oscillation, mechanism for simultaneously causing the rotation of said oscillating position in reversible directions and the corresponding rotation of the stitching position of the loop taker, compensating mechanism, operatively connected to the mechanism for causing the rotation of the oscillating position of the needle, for accelerating or retarding the stitching rotation of the loop taker to bring it into stitching unison with the reciprocation of the needle and a fabric frame suitably mounted to have motion.

10. In a sewing machine, the combination of a needle, a mounting for same suitably constructed to permit reciprocation, oscillation, and rotation of the oscillating position of the needle, a rotating loop taker, coöperating with said needle, adapted to have its stitching position rotated in accordance with the rotation of the oscillating position of the needle, mechanism for causing simultaneously the reciprocation of the needle and the stitching rotation of the loop taker, mechanism for causing the oscillation of the needle, mechanism for varying the amplitude of said oscillation, mechanism for simultaneously causing the rotation of said oscillating position in reversible directions and the corresponding rotation of the stitching position of the loop taker, compensating mechanism, consisting of differential gearing, operatively connected to the mechanism for causing the rotation of the oscillating position of the needle, and to the mechanism for causing the stitching rotation of the loop taker, adapted to accelerate or retard the stitching rotation of the loop taker to bring it into stitching unison with the reciprocation of the needle and a fabric frame suitably mounted to have motion.

11. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, mechanism for varying the amplitude of said oscillation, mechanism for causing rotation of said oscillating position in reversible directions and the synchronous positioning of said coöperating stitch forming mechanism to suit the rotation of said oscillating position, mechanism for carrying the needle clear of the fabric, keeping it there for any desired interval and then returning it to its operative position, a fabric frame suitably mounted to have motion, and mechanism suitably constructed to cause translation of said frame in all directions in a plane.

12. In a sewing machine, the combination of a needle, a mounting for same suitably constructed to permit reciprocation, oscillation, and rotation of the oscillating position of the needle, coöperating stitch forming mechanism, and mechanism suitably constructed to carry the needle clear of the fabric, to keep it clear for any desired interval and then return it to its operative position and a fabric frame suitably mounted to have motion, said mechanism for carrying the needle clear of the fabric being adapted to permit a plurality of reciprocations during the interval the needle is kept clear of the fabric.

13. In a sewing machine, the combination of a reciprocating needle and coöperating stitch forming mechanism, mechanism for substantially moving the needle out of reach of the fabric, keeping it out for any desired interval and restoring it to its operative position and a fabric frame suitably mounted to have motion, said mechanism for moving the needle out of reach of the fabric being suitably constructed to permit a plurality of reciprocations during the interval the needle is kept clear of the fabric.

14. In a sewing machine, the combination of a needle, a mounting for same suitably constructed to permit reciprocation, oscillation, and rotation of the oscillating position of the needle, coöperating stitch forming mechanism, a presser foot mounted to rotate with the oscillating position of the needle, and mechanism suitably constructed to carry the needle and presser foot clear of the fabric, to keep them clear for any desired interval and then return them to their operative positions and a fabric frame suitably mounted to have motion, said mechanism for carrying the needle and presser foot being adapted to permit a plurality of reciprocations of the needle during the interval the needle is kept clear of the fabric.

15. In a sewing machine, the combination of a needle suitably mounted to reciprocate, coöperating stitch forming mechanism, a presser foot and automatic mechanism for moving the needle and presser foot clear of the fabric, keeping them out for any desired interval and restoring them to their operative positions, without stopping the reciprocation of the needle and a fabric frame suitably mounted to have motion in combination with automatic means for controlling the direction of motion of said frame.

16. In a sewing machine, the combination of a needle bar, carrying a needle, mounted to reciprocate, means for causing the reciprocation of the needle bar including a rocker, coöperating stitch forming mechanism, automatic means, suitably constructed to shift the axis of rotation of said rocker, for bringing the needle out of reach of the fabric without stopping the reciprocation of the needle bar and the rocking of the rocker and a fabric frame suitably mounted to have motion in combination with automatic means for controlling the direction of motion of said frame.

17. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, mechanism for varying the amplitude of said oscillation, mechanism for causing the rotation of the oscillating position in reversible directions, a presser foot, thread tension mechanism, for putting the thread under proper tension for stitching, mechanism for carrying the needle and presser foot clear of the fabric adapted simultaneously also to release the tension on the thread, a fabric frame suitably mounted to have motion, and mechanism suitably constructed to cause translation of said frame in all directions in a plane.

18. In a sewing machine, the combination of a needle suitably mounted to reciprocate, oscillate and to have its oscillating position rotated, mechanism for varying the amplitude of oscillation of said needle, coöperating stitch forming mechanism, a fabric piercing tool adapted to rotate with the oscillating position of the needle and to have its point of entry into the fabric automatically adjusted to suit the amplitude of oscillation of the needle, and mechanism suitably constructed to reciprocate said tool repeatedly during the operation of the needle and said coöperating stitch forming mechanism.

19. In a sewing machine, the combination of a needle, a mounting for same suitably constructed to permit reciprocation and oscillation of the needle, mechanism for varying the amplitude of oscillation of said needle, coöperating stitch forming mechanism, a fabric piercing tool adapted automatically to have its point of entry into the fabric adjusted to suit the amplitude of oscillation of the needle, mechanism suitably constructed to reciprocate said tool repeatedly during the operation of the needle and said coöperating stitch forming mechanism, mechanism suitably constructed to cause said tool to become operative and inoperative, a fabric frame suitably mounted to have motion, and mechanism suitably constructed to cause translation of said frame in all directions in a plane.

20. In a sewing machine, the combination of a needle suitably mounted to reciprocate, oscillate and to have its oscillating position rotated, mechanism for varying the amplitude of oscillation of said needle, mechanism for causing the rotation of said oscillating position, coöperating stitch forming mechanism, a fabric piercing tool adapted to rotate with the oscillating position of the needle and to have its point of entry into the fabric automatically adjusted to suit the amplitude of oscillation of the needle, and mechanism, suitably constructed, to reciprocate said tool repeatedly during the operation of the needle and said coöperating stitch forming mechanism, mechanism for causing said tool to become operative and inoperative, a fabric frame suitably mounted to have motion, and mechanism suitably constructed to cause translation of said frame in all directions in a plane.

21. In a sewing machine, the combination of a needle suitably mounted to reciprocate, oscillate and to have its oscillating position rotated, coöperating stitch forming mechanism, a fabric piercing tool adapted to rotate with the oscillating position of the needle, mechanism for varying the amplitude of oscillation of the needle, operatively connected to the mounting of said tool, adapted to cause the points of entry of said tool into the fabric to be adjacent to the band of stitching being formed.

22. In a sewing machine, the combination of a needle mounted simultaneously to reciprocate, oscillate with variable amplitudes and to have its oscillating position rotated in reversible directions, means for causing the above motions, means for varying the amplitude of oscillation of the needle, coöperating stitch forming mechanism operating in stitching unison with the said needle in every position of the latter, a reciprocating fabric piercer operating simultaneously with and rotating about the same axis as said oscillating position, means for reciprocating the fabric piercer and means for varying the distance of the point of the piercer from its axis of rotation, being operatively connected with the means for varying the amplitude of oscillation of the needle, whereby the distance of the point of the piercer from its axis of rotation increases or decreases at the same rate as the amplitude of oscillation of the needle.

23. In a sewing machine, the combination of a needle suitably mounted to reciprocate, oscillate and to have its oscillating position rotated, coöperating stitch forming mechanism, a fabric piercing tool adapted to rotate with the oscillating position of the needle, and during the stitching operation, to cut away the fabric adjacent to the band of stitching being formed, and mechanism, suitably constructed to cause said fabric piercing tool to become operative and inoperative.

24. In a sewing machine, the combination of a needle suitably mounted to reciprocate, oscillate and to have its oscillating position rotated, mechanism for varying the amplitude of oscillation of said needle, mechanism for rotating said oscillating position, coöperating stitch forming mechanism, a fabric piercing tool adapted to rotate with the oscillating position of the needle and to have its point of entry into the fabric automatically adjusted to suit the amplitude of oscillation of the needle, and means suitably constructed to be thrown into an operative or an inoperative position independently of the operation of the stitching mechanism, said means adapted, when in its inoperative position, to cause said tool to reciprocate repeatedly with a long enough stroke to reach the fabric during the operation of the needle and said coöperating stitch forming mechanism, and when in its inoperative position to shorten the stroke of said tool enough to keep said tool clear of the fabric.

25. In a sewing machine, the combination of a needle suitably mounted, simultaneously to reciprocate, oscillate and to have its oscillating position rotated, coöperating stitch forming mechanism, mechanism for causing the rotation of the oscillating position of the needle and the synchronous positioning of said coöperating stitch forming mechanism, a fabric frame suitably mounted to have motion, mechanism adapted to cause translation of said frame in all directions in a plane, and means, suitably constructed, to reciprocate and oscillate said needle at a rate bearing a predetermined relation to the rate of translation of the frame.

26. In a sewing machine, the combination of a needle suitably mounted, simultaneously, to reciprocate, oscillate and to have its oscillating position rotated, mechanism for varying the amplitude of oscillation of said needle and for causing the rotation of said oscillating position, coöperating stitch forming mechanism, a fabric frame suitably mounted to have motion, mechanism adapted to cause translation of said frame in all directions in a plane, and means suitably constructed to reciprocate and oscillate said needle at a rate bearing a predetermined relation to the rate of translation of the frame.

27. In a sewing machine, a fabric frame suitably mounted to be given a motion of translation in all directions in a plane, means, for moving the frame, consisting of two component mechanisms, each component mechanism adapted to move the frame backward and forward along a predetermined line, and stitching mechanism suitably connected to each of said component mechanisms to produce stitches at a rate bearing a predetermined relation, to the resultant rate of travel of the frame.

28. In a sewing machine, a fabric frame suitably mounted to be given a motion of translation in all directions in a plane, means, for moving the frame, consisting of two component mechanisms, each component mechanism adapted to move the frame backward and forward along a predetermined line, and stitching mechanism having one of its shafts driven by one of said component mechanisms and another shaft driven by the other component mechanism, said stitching mechanism also having differential gearing for combining the rotation of said shafts, due to the motion of said component mechanisms, in such a manner that stitches are produced at a rate bearing a fixed relation, within a predetermined deviation, to the resultant rate of travel of the frame.

29. In a sewing machine, a fabric frame suitably mounted to be given a motion of translation in all directions in a plane, means, for moving the frame, consisting of two component mechanisms, each component mechanism adapted to move the frame backward and forward along a predetermined line, and stitching mechanism having one of its shafts driven by one of said component mechanisms and another shaft driven by the other component mechanism said stitching mechanism also having a set of differential gears adapted to add the rates of rotation of said shafts, another set of differential gears adapted to subtract the rates of rotation of said shafts and another set of differential gears adapted to add the sum and difference of the rates of rotation of said shafts, due to the motion of said component mechanism, whereby stitches are produced at a rate bearing a fixed relation, within a predetermined deviation, to the resultant rate of travel of the frame.

30. In a sewing machine, a fabric frame suitably mounted to be given a motion of translation in all directions in a plane, means, for moving the frame, consisting of two component mechanisms, each component mechanism adapted to move the frame backward and forward along a predetermined line, and stitching mechanism having one of its shafts driven by one of said component mechanisms and another shaft driven by the other component mechanism, the said shafts being connected to their respective component mechanisms through intervening mechanisms suitably constructed to cause said shafts to rotate in one direction only, irrespective of the directions of motion of their respective component mechanisms, the said stitching mechanism also having differential gearing for combining the rotation of said shafts in such a manner that stitches are produced at a rate bearing a fixed relation, within a predetermined deviation, to the resultant rate of travel of the frame.

31. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, pattern controlled mechanism for automatically causing rotation of said oscillating position in reversible directions and the synchronous positioning of said coöperating stitch forming mechanism, a fabric frame suitably mounted to have motion, and pattern controlled mechanism adapted to cause automatically translation of said frame in all directions in a plane.

32. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, pattern controlled mechanism for automatically varying the amplitude of said oscillation, pattern controlled mechanism for automatically causing rotation of said oscillating position in reversible directions and the synchronous positioning of said coöperating stitch forming mechanism, a fabric frame suitably mounted to have motion, and pattern controlled mechanism adapted to cause automatically translation of said frame in all directions in a plane.

33. A sewing machine comprising, stitching mechanism, a fabric frame suitably mounted to be given a motion of translation in all directions in a plane, a plurality of unit elements for causing the motion of said frame, and a record marked in accordance with the desired design for automatically controlling the motions of said unit elements, each unit element having a selector comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead, mechanism, intervening between said unit elements and said stitching mechanism, suitably constructed to cause the stitching mechanism to form stitches at a rate bearing a predetermined relation to the resultant motion of the fabric frame.

34. In a sewing machine, the combination of a needle, a mounting for same suitably constructed to permit reciprocation and oscillation, coöperating stitch forming mechanism, mechanism for causing the reciprocation and oscillation of the needle, a fabric frame suitably mounted to be given a motion of translation, and pattern controlled mechanism adapted to cause automatically said translation in all directions in a plane, said pattern controlled mechanism consisting of at least two component parts, each component part adapted to cause motion of said frame in reversible directions along the line predetermined for said component, said reciprocation being controlled in accordance with the motion of the frame resulting from its combined motions along said components.

35. In a sewing machine, the combination of a needle, a mounting for same suitably constructed to permit reciprocation and oscillation, coöperating stitch forming mechanism, mechanism for causing the reciprocation and mechanism for causing the oscillation of the needle, pattern controlled mechanism for automatically varying the amplitude of said oscillation, a fabric frame suitably mounted to have motion, and pattern controlled mechanism adapted to cause automatically translation of said frame in all directions in a plane, said pattern controlled mechanism consisting of at least two component parts, each component part adapted to cause motion of said frame in reversible directions along the line predetermined for said component, said reciprocation being controlled in accordance with the motion of the frame resulting from its combined motions along said components.

36. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, pattern controlled mechanism for automatically varying the amplitude of said oscillation, pattern controlled mechanism adapted to rotate said oscillating position, automatically, in reversible directions and to position said coöperating stitch forming mechanism to suit the rotation of said oscillating position, pattern controlled mechanism for automatically carrying the needle clear of the fabric, keeping it there for an interval and then returning it to its operative position in accordance with the pattern, a fabric frame suitably mounted to have motion, and pattern controlled mechanism adapted to cause automatically translation of said frame in all directions in a plane.

37. In a sewing machine, the combination of a needle, a mounting for same suitably constructed to permit reciprocation and oscillation of the needle, pattern controlled mechanism for varying the amplitude of oscillation of said needle, coöperating stitch forming mechanism, a fabric piercing tool adapted automatically to have its point of entry into the fabric adjusted to suit the amplitude of oscillation of the needle, means suitably constructed to reciprocate said tool repeatedly during the operation of the needle, pattern controlled mechanism for causing said means to become operative and inoperative, a fabric frame suitably mounted to have motion, and pattern controlled mechanism adapted to cause automatically translation of said frame in all directions in a plane.

38. In a sewing machine, the combination of a needle suitably mounted to reciprocate, oscillate and have its oscillating position rotated, pattern controlled mechanism for automatically varying the amplitude of oscillation of said needle, pattern controlled mechanism for automatically causing the rotation of said oscillating position, coöperating stitch forming mechanism, a fabric piercing tool adapted to rotate with the oscillating position of the needle and to have its point of entry into the fabric automatically adjusted to suit the amplitude of oscillation of the needle, mechanism, suitably constructed, to reciprocate said tool repeatedly during the operation of the needle, and pattern controlled mechanism for causing said tool to become operative or inoperative in accordance with that called for by the pattern, a fabric frame suitably mounted to have motion, and pattern controlled mechanism adapted to cause automatically translation of said frame in all directions in a plane.

39. In a sewing machine, the combination of a needle suitably mounted to reciprocate, oscillate and to have its oscillating position rotated, pattern controlled mechanism for automatically varying the amplitude of oscillation of the needle and for automatically causing the rotation of its oscillating position, coöperating stitch forming mechanism, a fabric piercing tool adapted to rotate with the oscillating position of the needle and to have its point of entry into the fabric automatically adjusted to suit the amplitude of oscillation of the needle, and pattern controlled mechanism adapted to cause said tool to become operative or inoperative in accordance with that called for by the pattern.

40. In a sewing machine, the combination of a needle suitably mounted, simultaneously, to reciprocate, oscillate and to have its oscillating position rotated, pattern controlled mechanism for automatically varying the amplitude of oscillation of said needle and for automatically causing the rotation of said oscillating position, coöperating stitch forming mechanism, a fabric frame suitably mounted to have motion, pattern controlled mechanism adapted to cause automatically translation of said frame in all directions in a plane, and mechanism suitably constructed to reciprocate and oscillate said needle at a rate bearing a predetermined relation to the rate of translation of said frame.

41. In a sewing machine, a fabric frame suitably mounted to be given a motion of translation in all directions in a plane, pattern controlled means, for moving the frame, consisting of two component mechanisms, each component mechanism adapted to move the frame backward and forward along a predetermined line and each component mechanism having a pattern for controlling the motion along its particular line, and stitching mechanism suitably connected to each of said component mechanisms to produce stitches at a rate bearing a predetermined relation to the resultant rate of travel of the frame.

42. In a sewing machine, the combination of a needle, a mounting for same suitably constructed to permit reciprocation, oscillation, and rotation of the oscillating position of the needle, coöperating stitch forming mechanism, mechanism for causing the reciprocation and oscillation of the needle, mechanism for causing rotation of said oscillating position and the synchronous positioning of said coöperating stitch forming mechanism, a fabric frame suitably mounted to have motion, mechanism suitably constructed to cause translation of said frame in all directions in a plane, and a record perforated in accordance with the desired design for controlling the action of the mechanisms for rotating said oscillating position and for moving the fabric frame.

43. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, mechanism for causing rotation of said oscillating position and the synchronous positioning of said coöperating stitch forming mechanism, mechanism for varying the amplitude of said oscillation, a fabric frame suitably mounted to have motion, mechanism suitably constructed to cause translation of said frame in all directions in a plane, and a record, perforated in accordance with the desired design, for controlling the action of the mechanisms for rotating said oscillating position, for varying said amplitude and for moving the fabric frame.

44. A sewing machine comprising a plurality of needles, coöperating stitch forming mechanism, a fabric frame suitably mounted to have motion, mechanism suitably constructed to cause translation of said frame in all directions in a plane and means for stopping the operation of the machine adapted to be actuated upon the breaking or slacking of any thread, said means having a member adapted to be rotated by the pulling of the threads as the latter are wrapped about its surface on their way to the needles, said member having a surface adapted to grip the threads by friction.

45. In a sewing machine, the combination of a needle, a mounting for same suitably constructed to permit reciprocation, oscillation, and rotation of the oscillating position of the needle, coöperating stitch forming mechanism, mechanism for causing the reciprocation and mechanism for causing the oscillation of the needle, mechanism for varying the amplitude of said oscillation, mechanism for causing rotation of said oscillating position and the synchronous positioning of said coöperating stitch forming mechanism, mechanism for carrying the needle clear of the fabric, keeping it there for an interval and then returning it to its operative position, a fabric frame suitably mounted to have motion, mechanism suitably constructed to cause translation of said frame in all directions in a plane, and a record, perforated in accordance with the desired design, for controlling the action of the mechanisms for rotating said oscillating position, for varying said amplitude, for moving the fabric frame and for controlling the length of the intervals the needle is in its operative and inoperative positions.

46. In a sewing machine, the combination of a needle, a mounting for same suitably constructed to permit reciprocation and oscillation of the needle, mechanism for varying the amplitude of oscillation of said needle, coöperating stitch forming mechanism, a fabric piercing tool adapted automatically to have its point of entry into the fabric adjusted to suit the amplitude of oscillation of the needle, mechanism adapted to reciprocate said tool repeatedly during the operation of the needle and said coöperating stitch forming mechanism, mechanism for causing said tool to become operative and inoperative, a fabric frame suitably mounted to have motion, mechanism suitably constructed to cause translation of said frame in all directions in a plane, and a record, perforated in accordance with the desired design, for controlling the action of the mechanisms for varying said amplitude, for moving the fabric frame, and for controlling the length of the intervals said tool is operative and inoperative.

47. In a sewing machine, the combination of a needle suitably mounted to reciprocate, oscillate and to have its oscillating position rotated, mechanism for varying the amplitude of oscillation of said needle, mechanism for causing the rotation of said oscillating position, coöperating stitch forming mechanism, a fabric piercing tool adapted to rotate with the oscillating position of the needle and to have its point of entry into the fabric automatically adjusted to suit the amplitude of oscillation of the needle, mechanism suitably constructed to reciprocate said tool repeatedly during the operation of the needle, mechanism for causing said tool to become operative and inoperative, a fabric frame suitably mounted to have motion of translation, mechanism suitably constructed to cause translation of said frame in all directions in a plane, and a record, perforated in accordance with the desired design, for controlling the action of the mechanisms for varying said amplitude, for causing rotation of said oscillating position, for moving the fabric frame and for controlling the length of the intervals said tool is operative and inoperative.

48. In a sewing machine, the combination of a needle suitably mounted to reciprocate, oscillate and to have its oscillating position rotated, mechanism for varying the amplitude of oscillation of the needle and for causing the rotation of its oscillating position, coöperating stitch forming mechanism, a fabric piercing tool adapted to rotate with the oscillating position of the needle and to have its point of entry into the fabric automatically adjusted to suit the amplitude of oscillation of the needle, mechanism adapted to cause said tool to become operative and inoperative, and a record, perforated in accordance with the desired design, for controlling the action of the mechanism for varying the amplitude and for rotating the oscillating position, and the action of the mechanism for causing said tool to become operative and inoperative.

49. In a sewing machine, the combination of a needle suitably mounted, simultaneously to reciprocate, oscillate and to have its oscillating position rotated, coöperating stitch forming mechanism, mechanism for causing the rotation of the oscillating position of the needle and the synchronous positioning of said coöperating stitch forming mechanism, a fabric frame suitably mounted to have motion, mechanism adapted to cause translation of said frame in all directions in a plane, means suitably constructed to reciprocate and oscillate said needle at a rate bearing a predetermined relation to the rate of translation of the frame, a record, perforated in accordance with the desired design, for controlling the action of the mechanisms for rotating the oscillating position and for moving the fabric frame.

50. In a sewing machine, the combination of a needle suitably mounted, simultaneously, to reciprocate, oscillate and to have its oscillating position rotated, mechanism for varying the amplitude of oscillation of said needle and for causing the rotation of said oscillating position, coöperating stitch forming mechanism, a fabric frame suitably mounted to have motion, mechanism adapted to cause translation of said frame in all directions in a plane, means suitably constructed to reciprocate and oscillate said needle at a rate bearing a predetermined relation to the rate of translation of the frame, and a record perforated in accordance with the desired design for controlling the action of said mechanism for varying the amplitude and controlling the rotation, and the action of the mechanism for moving the frame.

51. In a sewing machine, a fabric frame suitably mounted to be given a motion of translation in all directions in a plane, means, for moving the frame, consisting of two component mechanisms, each component mechanism adapted to move the frame backward and forward along a predetermined line, stitching mechanism suitably connected to each of said component mechanisms to produce stitches at a rate bearing a predetermined relation to the resultant rate of travel of the frame, and a record, perforated in accordance with the desired design, for controlling the speed and direction of motion of the fabric frame along each component.

52. In a sewing machine, the combination of a plurality of needles, a mounting for each needle suitably constructed to permit reciprocation, oscillation and rotation of the oscillating position of each needle, coöperating stitch forming mechanism for each needle, a common driving member for causing the reciprocation and a common driving member for causing the oscillation of the said needles, a common driving member for varying the amplitude of said oscillation, a common driving member for causing rotation of the oscillating positions of the needles and the synchronous positioning of said coöperating stitch forming mechanisms, a fabric frame suitably mounted to have motion, and mechanism suitably constructed to cause translation of said frame in all directions in a plane.

53. In a sewing machine, the combination of a plurality of needles, a mounting for each needle suitably constructed to permit reciprocation, oscillation, and rotation of the oscillating position of each needle, coöperating stitch forming mechanism for each needle, a common driving member for causing the reciprocation and a common driving member for causing the oscillation of the said needles, a common driving member for varying the amplitude of said oscillation, a common driving member for causing rotation of the oscillating positions of the needles and the synchronous positioning of said coöperating stitch forming mechanisms, a fabric frame suitably mounted to have motion, mechanism suitably constructed to cause translation of said frame in all directions in a plane, and pattern actuated mechanism for controlling the action of the mechanism for moving the frame and for controlling the motions of said common members for varying the amplitude and rotating the oscillating positions.

54. In a sewing machine, the combination of a plurality of needles, a mounting for each needle suitably constructed to permit reciprocation, oscillation and rotation of the oscillating position of each needle, coöperating stitch forming mechanism for each needle, a common driving member for causing the reciprocation and a common driving member for causing the oscillation of the said needles, a common driving member for varying the amplitude of said oscillation, a common driving member for causing rotation of the oscillating positions of the needles and the synchronous positioning of said coöperating stitch forming mechanisms, a fabric frame suitably mounted to have motion, mechanism suitably constructed to cause translation of said frame in all directions in a plane, and a record, perforated in accordance with the desired design, for controlling the action of the mechanism for moving the fabric frame and for controlling the motions of said common members for varying the amplitude and rotating the oscillating positions.

55. A sewing machine comprising, a plurality of needles, mountings for same, suitably constructed to permit reciprocation, oscillation and rotation of the oscillating positions of the needles, coöperating stitch forming mechanism, a fabric frame suitably mounted to have motion, mechanism suitably constructed to cause translation of said frame in all directions in a plane and mechanism suitably constructed to stop the operation of the machine upon the breaking of any thread.

56. A sewing machine comprising, a plurality of needles, mountings for same, suitably constructed to permit reciprocation, oscillation and rotation of the oscillating positions of the needles, mechanism for causing the reciprocation and oscillation of the needles, mechanism for varying the amplitude of oscillation of the needles, mechanism for rotating said oscillating positions, coöperating stitch forming mechanism, a fabric frame suitably mounted to have motion, mechanism suitably constructed to cause translation of said frame in all directions in a plane, and trip mechanism suitably constructed to stop the motion of the fabric frame upon the breaking of any thread.

57. A sewing machine comprising, a plurality of needles, mountings for same suitably constructed to permit reciprocation, oscillation and rotation of the oscillating positions of the needles, mechanism for causing the reciprocation and oscillation of the needles, mechanism for varying the amplitude of oscillation of the needles, mechanism for rotating said oscillating positions, coöperating stitch forming mechanism, a fabric frame suitably mounted to have motion, mechanism suitably constructed to cause translation of said frame in all directions in a plane, and mechanism suitably constructed to stop the motion of the fabric frame and to hold the needles clear of the fabric upon the breaking of any thread.

58. A sewing machine comprising a plurality of needles, mountings for same, suitably constructed to permit reciprocation, oscillation, and rotation of the oscillating positions of the needles, coöperating stitch forming mechanism, a fabric frame suitably mounted to have motion, mechanism suitably constructed to cause translation of said frame in all directions in a plane, and mechanism, adapted to control electric circuits, for stopping the operation of the machine adapted to be actuated upon the breaking of any thread.

59. A sewing machine comprising, a plurality of needles with their coöperating stitch forming mechanisms, a fabric frame suitably mounted to have motion, mechanism suitably constructed to cause translation of said frame in all directions in a plane and to control the action of the stitch forming mechanism, and trip mechanism, for stopping the operation of the machine upon the breaking of any thread, having a plurality of tumblers, a tumbler held suspended from each thread, a reciprocating member, having holes to correspond to said tumblers, adapted to move under said tumblers, a rotating member with a roughened surface located between the thread source and the tumblers for gripping the thread by friction as it is passed around said rotating member on its way from the thread source to the needle and adapted to be rotated by the pulling of the thread.

60. In a sewing machine, the combination of a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit-element for varying the amplitude of said oscillation, a unit element for causing rotation of said oscillating position, a plurality of unit elements for causing the motion of said frame, and a record marked in accordance with the desired design for automatically controlling the motions of the several unit elements, each unit element having a selector comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead.

61. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design for automatically controlling the motions of the several unit elements, each unit element having a selector, suitably constructed to control electric currents, comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead.

62. A sewing machine comprising, a needle, a mounting for same, suitably constructed to permit reciprocation and oscillation of said needle, coöperating stitch forming mechanism, a fabric frame suitably mounted to have motion, unit elements for causing the motions of the needle and the fabric frame, and a record marked in accordance with the desired design for automatically controlling the motions of the several unit elements, each unit element having a selector comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead.

63. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record perforated in accordance with the desired design for automatically controlling the motions of the several unit elements, each unit element having a selector comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead.

64. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design for automatically controlling the motions of the several unit elements, each unit element having a selector comprising two parts adapted to have relative motion with each other in a fixed relation to the motion of the unit element, adapted by the relative position of said two parts to cause actuation of the unit element for motion in the forward direction when its position is behind that called for by the record, in the backward direction when its position is ahead and to cause actuation for suspension of its driving action when its position coincides with that called for by the record.

65. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, a source of energy, each unit element having a plurality of conductors and a plurality of terminals, and means for controlling the connection of said source through said conductors to said terminals, the said terminals, corresponding to predetermined positions of their unit element and arranged in cycles, the corresponding terminals of the several cycles being connected to each other and to one of said conductors, each unit element, having in addition thereto, selecting means suitably constructed to have relative movement with said terminals in a fixed relation to the motion of its unit element, for controlling the action of same.

66. In a sewing machine, the combination of a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a source of energy, a record perforated in accordance with the desired design, each unit element having a plurality of terminals placed adjacent to each other, any two adjacent terminals corresponding to adjacent positions of the unit element, and mechanism adapted to control the connection of said source to said terminals, means suitably constructed to produce continuous relative movement of the record and said mechanism, said mechanism adapted to be actuated thereby in accordance with the perforations of the record, whereby said terminals are caused to become actuating terminals in the succession called for by the perforations of the record, selecting means, forming a part of each unit element, suitably constructed to have relative motion with said terminals in a fixed relation to the motion of its unit element, for controlling the motion of its unit element, in direction in accordance with that called for by the perforations of the record, and in speed in accordance with said perforations and in accordance with the speed of said relative movement of the record.

67. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design, each unit element having a plurality of terminals, any two consecutive terminals corresponding to adjacent positions of the unit element, and selecting means suitably constructed to have relative motion with the said terminals in a fixed relation to the motion of the unit element, for controlling the motion of the unit element in accordance with that called for by the record, said record having marks in suitable order to cause said terminals to be made actuating terminals in consecutive succession, said marks being spaced close enough together in the direction of feed of the record so that there is always at least one actuating terminal for a unit element.

68. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, each unit element having a plurality of terminals, any two consecutive terminals corresponding to adjacent positions of the unit element, and selecting means, suitably constructed to have relative movement with said terminals in a fixed relation to the motion of its unit element, a record, having marks in suitable order to cause said terminals to become actuating terminals in accordance with the speeds desired for the unit elements, said record having groups of marks in immediate succession corresponding to the same terminals, whereby any of said terminals at various times are caused to remain actuating terminals for prolonged intervals, all the marks of the record being spaced close enough in the direction of feed of the record so that there is always at least one actuating terminal at every instant for each each unit element, mechanism suitably constructed to produce a continuous feeding motion of the record, the speed of the unit elements depending upon the frequency of recurrence and the lengths of said prolonged intervals and upon the speed of feeding motion of the record.

69. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design for controlling the action of said unit elements, each unit element having a selector comprising two parts, namely, a series of terminals arranged in a ring and selecting means adapted to have relative rotation with said terminals in a fixed relation to the motion of its unit element adapted by the relative position of said two parts to cause actuation of the unit element for motion in the forward direction when its position is behind that called for by the record and in the backward direction when its position is ahead.

70. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design for controlling the action of said unit elements, each unit element having a selector comprising two parts, namely, a series of terminals, and selecting means adapted to have relative motion with said terminals at a faster rate than the motion of its unit element and in a fixed relation thereto.

71. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design for automatically controlling the action of the several unit elements, each unit element having clutches for causing its motion in reversible directions, and a selector comprising two parts adapted to have relative motion with each other in a fixed relation to the motion of its unit element, adapted by the relative position of said two parts to cause actuation of said clutches for motion of the unit element in the forward direction when its position is behind that called for by the record, and in the backward direction when its position is ahead.

72. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design for automatically controlling the action of the several unit elements, each unit element having clutches for causing its motion in reversible directions, and a selector comprising two parts adapted to have relative motion with each other in a fixed relation to the motion of its unit element, adapted by the relative position of said two parts to cause actuation of said clutches for motion of the unit element in the forward direction when its position is behind that called for by the record, in the backward direction when its position is ahead, and to cause actuation for the suspension of their driving action when its position coincides with that called for by the record.

73. In a sewing machine, the combination of a needle, a mounting for same, suitably constructed to cause reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record perforated in accordance with the desired speeds and directions of motion of the several unit elements for automatically controlling their motions, a source of electricity, each unit element having clutches for driving it, electromagnetic means for controlling the action of said clutches, and selecting means, comprising two parts suitably constructed to have relative motion with each other in a fixed relation to the motion of its unit element, for controlling the flow of electricity to said electromagnetic means, whereby the speed and direction of motion of each unit element for every instant, are in accordance with the record.

74. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record perforated in accordance with the desired design for controlling the motion of the several unit elements, each unit element having friction clutches for causing its motion, and a selector, comprising two parts suitably constructed to have relative motion with each other in a fixed relation to the motion of its unit element, adapted to coact with the perforation of the record.

75. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a source of energy and a record marked in accordance with the desired design, each unit element having selecting means comprising two parts, one part suitably constructed to be controlled by the relative motion of the record and the same said part, and the other part suitably constructed to be controlled by and in accordance with the motion of its unit element, the said selecting means adapted to coöperate with the markings of said record to control the transmission of said energy to its unit element in such manner that its unit element is caused to have a position at every instant within the limits of a predetermined deviation from the position called for by the record at the corresponding instant, the construction of said selecting means determining the extent of said deviation.

76. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record, marked in accordance with the desired design, for automatically controlling the action of said unit elements, and mechanism for feeding said record with a continuous feeding motion, each unit element having a selector comprising two parts adapted to have relative motion with each other in a fixed relation to the motion of the unit element, adapted by the relative position of said two parts to cause actuation of the unit element for motion in the forward direction when its position is behind that called for by the record and in the backward direction when its position is ahead.

77. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record marked in accordance with the desired design for automatically controlling the action of said unit elements, having its marks spaced close enough together in the direction of its feed so that there is always at least one mark for each unit element in control at every instant, each unit element having a selector comprising two parts adapted to have relative motion with each other in a fixed relation to the motion of its unit element and adapted to coöperate with the marks of the record in controlling the motion of its unit element.

78. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, and a record, perforated in accordance with the desired design, having its perforations spaced with an overlap in the direction of feed of the record, each unit element having a selector suitably constructed to be actuated by and in accordance with its motion and adapted to coöperate with the perforations of the record for controlling its motion.

79. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, having its marks spaced close enough together in the direction of its feed so that there is always at least one mark in control at every instant for each unit element, and mechanism for feeding the record suitably constructed to produce a continuous feeding motion, each unit element having a selector suitably constructed to be actuated by and in accordance with the motion of its unit element and adapted to coöperate with the marks of the record for controlling the motion of its unit element.

80. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a source of power, clutches for each unit element adapted to take off the power in reversible directions from the power source for the motion of the unit elements, adapted by their successive engagements and disengagements with the power source to control the motion of the unit elements, a record perforated in accordance with the desired design, and a series of tracker ducts forming a part of each unit element, said clutches adapted to be controlled in their action by the relative movement of the record and said tracker ducts.

81. In a sewing machine, the combination of a needle, a mounting for same, suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a perforated record, a series of tracker ducts, electric terminals and fluid-pressure-actuated-means, controlled by the relative movement of the record and said tracker ducts, forming a part of each unit element, the perforations of the record selecting and controlling the making and breaking of the circuits between the said terminals whereby the action of said unit elements are controlled.

82. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit element are controlled, means, forming a part of each unit element, and controlled by the motions of the unit elements adapted to control the action of said means for producing the relative movement of the record, and adapted to coöperate with the record to control the motions of the unit elements, whereby the motions of all the unit elements and the relative movement of the record are kept in synchronism.

83. A sewing machine comprising, a needle, a mounting for same, suitably constructed to permit reciprocation and oscillation of said needle, coöperating stitch forming mechanism, a fabric frame suitably mounted to have motion, unit elements for causing the motions of the needle and fabric frame, and a record marked in accordance with the desired design, and means for producing relative movement of the record and a part of each unit element, whereby the motions of the unit elements are controlled, means, forming a part of each unit element and controlled by the motions of the unit elements adapted to control the action of said means for producing the relative movement of the record, and adapted to coöperate with the record to control the motions of the unit elements, whereby the motions of all the unit elements and the relative movement of the record are kept in synchronism.

84. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record perforated in accordance with the desired design, and means for producing relative movement of the record and a part of each unit element, whereby the motions of the unit elements are controlled, means, forming a part of each unit element, and controlled by the motions of the unit elements adapted to control the action of said means for producing the relative movement of the record, and adapted to coöperate with the record to control the motions of the unit elements, whereby the motions of all the unit elements and the relative movement of the record are kept in synchronism.

85. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, means, forming a part of each unit element, for stopping automatically said relative movement, adapted to be actuated when the motion of any unit element lags behind that called for by said relative movement and by the marking of the record.

86. A sewing machine comprising, a needle, a mounting for same suitably constructed to permit reciprocation and oscillation of said needle, coöperating stitch forming mechanism, a fabric frame suitably mounted to have motion, unit elements for causing the motions of the needle and the fabric frame, a record marked in accordance with the desired design, means for producing relative movement of the record and a part of each unit element, whereby the motion of the unit elements are controlled, and means, forming a part of each unit element, for stopping automatically said relative movement, adapted to be actuated when the motion of any unit element lags behind that called for by said relative movement and by the marking of the record.

87. A sewing machine comprising, a needle, a mounting for same suitably constructd to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, means, forming a part of each unit element, for stopping automatically said relative movement, adapted to be actuated when the motion of any unit element becomes faster than that called for by said relative movement and by the marking of the record.

88. A sewing machine comprising, a needle, a mounting for same, suitably constructed to permit reciprocation and oscillation of said needle, coöperating stitch forming mechanism, a fabric frame suitably mounted to have motion, unit elements for causing the motions of the needle and the fabric frame, a record marked in accordance with the desired design, means for producing relative movement of the record and a part of each unit element, whereby the motions of the unit elements are controlled, and means, forming a part of each unit element, for stopping automatically said relative movement, adapted to be actuated when the motion of any unit element becomes faster than that called for by said relative movement and by the marking of the record.

89. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all direction in a plane, a unit element for varying the amplitude of said oscillation, a unit element for causing rotation of said oscillating position, a plurality of unit elements for causing the motion of said frame, a record perforated in accordance with the desired design, and means for producing relative movement of the record and a part of each unit element, whereby the motions of the unit elements are controlled, means, forming a part of each unit element for stopping automatically said relative movement adapted to be actuated when the motion of any unit element lags behind that called for by said relative movement and by the perforations of the record.

90. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, means, forming a part of each unit element, for stopping the said relative movement, adapted to be actuated when the motion of any unit element lags behind by more than a predetermined amount from that called for by said relative movement and by the marking of the record, each unit element having means, controlled by its motion, for automatically moving it forward toward the position called for by the marking and position of the record when it lags behind, and means, controlled by the motions of all the unit elements, adapted to be suitably actuated for causing said relative movement of the record when all the unit elements are behind less than said amount.

91. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, means, forming a part of each unit element, for stopping the said relative movement, adapted to be actuated when the motion of any unit element runs ahead by more than a predetermined amount of that called for by said relative movement and by the marking of the record, each unit element having means, controlled by its motion, for automatically causing it to assume the position called for by the marking and the position of the record, and means controlled by the motions of all the unit elements, adapted to be suitably actuated for causing said relative movement of the record when all the unit elements are ahead less than said predetermined amount.

92. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, each unit element having means for automatically stopping its motion, when its motion becomes slow enough to cause it and the record to be out of their proper relation by more than a predetermined amount.

93. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, each unit element having means for automatically stopping its motion, when its motion becomes fast enough to cause it and the record to be out of their proper relation by more than a predetermined amount.

94. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative motion of the record and a part of each unit element, whereby the motions of the unit elements are controlled, each unit element having electrical means, actuated in accordance with its position, for automatically controlling the action of said means for producing the relative movement of the record, whereby the said relative movement is kept in proper relation to the motion of all the unit elements.

95. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, each unit element having means for automatically stopping both its own motion and the relative movement of the record, when they are out of proper relation by more than a predetermined amount.

96. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, each unit element having means for causing said relative movement of the record while it is not in the position called for by the marking and the position of the record until a predetermined amount of error is exceeded, and also having means for stopping said relative movement adapted to be actuated when said error is exceeded.

97. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, each unit element having a selector consisting of a plurality of terminals and a plurality of selector arms, the relative movement between said selector arms and said terminals being in a fixed relation to the motion of the unit element, each of said selector arms adapted, while registering with a terminal actuated by the record, to control the motion of its unit element in a particular manner predetermined for the selector arm by its connections and to cause the relative movement of the record, said selector arms adapted to register simultaneously with several of said terminals, thereby permitting the several terminals to become actuating terminals without corresponding motion of its unit element, and each unit element having means for stopping said relative movement of the record, adapted to be actuated when an actuating terminal occurs beyond the range of said selector arms.

98. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, each unit element having a selector consisting of two parts adapted to have relative motion with each other in a fixed relation to the motion of its unit element, means for producing relative movement of the record and one of said selector parts whereby the motion of the unit element is automatically controlled, a source of power for driving said means for producing said relative movement of the record, clutches, adapted to engage and disengage the said means for producing the relative movement of the record with the power source, said selector adapted to actuate said clutches to cause the engagement of said means, for producing the relative movement of the record, with the power source, when the position of its unit element at any instant is within a predetermined deviation from the position called for by the record at the corresponding instant, and the disengagement when its position is out more than said predetermined deviation.

99. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, a friction clutch for controlling the relative motion of the record and a part of each unit element, whereby the successive marks of the record are enabled to become operative, and means forming a part of each unit element actuated by and in accordance with the motion of all the unit elements for controlling the action of said clutch.

100. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, means for producing relative movement between the record and a part of each unit element whereby the motions of the unit elements are controlled, a solenoid adapted to control the action of said means for producing the relative movement of the record, and means forming a part of each unit element controlled by the motion of each unit element, adapted to control the energization of said solenoid, whereby said relative movement of the record is controlled by the motions of all the unit elements.

101. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, each unit element having a plurality of terminals and a plurality of selector arms, said terminals and selector arms adapted to have relative motion with each other in a fixed relation to the motion of their respective unit elements, means for producing relative motion of the record and a part of each unit element whereby the terminals of each unit element are caused to be actuating terminals in the succession called for by the marking of the record, said selector arms, adapted while registering with actuating terminals, to control the motion of the unit elements and to control the relative motion of the record.

102. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, a neutral selector arm, forming a part of each unit element, moving in a fixed relation to the motion of its unit element, adapted when the position of its unit element coincides within a predetermined limit of error with the position called for by the record, to suspend the driving action of its unit element and to actuate the said means for producing the relative movement of the record to cause the said relative movement.

103. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, a source of electricity, selector arms, forming a part of each unit element, moving in a fixed relation to the motion of their respective unit elements and adapted to control the flow of electricity from said source to the means for producing the said relative movement of the record, whereby the said relative movement of the record is controlled in accordance with the motion of all the unit elements.

104. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, a source of energy, selector arms forming a part of each unit element, moving in a fixed relation to the motion of their respective unit elements and adapted to control the transmission of said energy to the means for producing the relative movement of the record, whereby actuation is produced for stopping the said relative movement of the record when not in proper relation to the motion of any unit element.

105. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, and means for producing relative movement of the record and a part of each unit element, whereby the motions of the unit elements are controlled, a source of energy, each unit element having selector arms moving in a fixed relation to its motion, said arms adapted to control the transmission of said energy from said source through the means for producing the relative movement of the record in such manner whereby said relative movement of the record is caused when a proper relation obtains between each unit element and the record.

106. A sewing machine comprising, a needle, a mounting for same suitably constructed to permit reciprocation, oscillation and rotation of the oscillating position of the needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, each unit element having a plurality of terminals and a plurality of selector arms, said terminals and selector arms adapted to have relative motion with each other in a fixed relation to the motion of their respective unit elements, means for producing relative motion of the record and a part of each unit element whereby the terminals of each unit element are caused to be actuating terminals in the succession called for by the marking of the record, said selector arms adapted while registering with actuating terminals, to cause motion of their respective unit elements and to stop said relative movement of the record.

107. A sewing machine comprising, a needle, a mounting for same suitably constructed to permit reciprocation, oscillation and rotation of the oscillating position of said needle, coöperating stitch forming mechanism, a fabric frame suitably mounted to be given a motion of translation in all directions in a plane, a unit element for varying the amplitude of said oscillation, a unit element for causing rotation of said oscillating position, a plurality of unit elements for causing the motion of said frame, a record marked in accordance with the desired design, each unit element having a plurality of terminals and a plurality of selector arms, said terminals and selector arms adapted to have relative motion with each other in a fixed relation to the motion of their respective unit elements, means for producing relative motion of the record and a part of each unit element whereby the terminals of each unit element are caused to be actuating terminals in the succession called for by the marking of the record, and means forming a part of each unit element adapted to stop the motions of all the unit elements and the relative motion of the record when an actuating terminal occurs beyond the range of the selector arms for any unit element.

108. A sewing machine comprising, a plurality of needles and coöperating stitch forming mechanism, a fabric frame, unit elements for controlling the action of the needles and stitching mechanism and the motion of the fabric frame, a record marked in accordance with the desired design, means for producing relative movement of the record and a part of each unit element, whereby the motions of the unit elements are controlled, means, forming a part of each unit element, and controlled by the motions of the unit elements, adapted to control the action of said means for producing said relative movement of the record, and adapted to coöperate with the record to control the motions of the unit elements, independent means adapted to cause actuation of the means for producing said relative movement, to stop said relative movement, upon the breaking of any thread.

Signed at New York, in the county of New York and State of New York, this 3d day of March, 1916.

ALBERT BERSIN.
EMANUEL SCHEYER.